(12) United States Patent
Hatai et al.

(10) Patent No.: US 6,285,118 B1
(45) Date of Patent: Sep. 4, 2001

(54) FIELD EMISSION-TYPE ELECTRON SOURCE AND MANUFACTURING METHOD THEREOF AND DISPLAY USING THE ELECTRON SOURCE

(75) Inventors: Takashi Hatai, Neyagawa; Takuya Komoda, Sanda; Yoshiaki Honda, Kyoto; Koichi Aizawa, Neyagawa; Yoshifumi Watabe, Tondabayashi; Tsutomu Ichihara; Yukihiro Kondo, both of Hirakata; Nobuyoshi Koshida, Kodaira, all of (JP)

(73) Assignee: Matsushita Electric Works, Ltd., Osaka (JP)

(*) Notice: Subject to any disclaimer, the term of this patent is extended or adjusted under 35 U.S.C. 154(b) by 0 days.

(21) Appl. No.: 09/440,166

(22) Filed: Nov. 15, 1999

(30) Foreign Application Priority Data

| Nov. 16, 1998 | (JP) | 10-325106 |
| Apr. 15, 1999 | (JP) | 11-108632 |
| Apr. 23, 1999 | (JP) | 11-115718 |
| Sep. 14, 1999 | (JP) | 11-260302 |

(51) Int. Cl.$^7$ .................................................. H01J 9/02
(52) U.S. Cl. ............................. 313/310; 445/24; 445/50
(58) Field of Search ........................... 445/24, 50, 51; 313/310

(56) References Cited

U.S. PATENT DOCUMENTS

| 3,665,241 | 5/1972 | Spindt et al. |
| 4,291,318 | * 9/1981 | Sansregret .......................... 257/54 |
| 5,430,300 | 7/1995 | Yue et al. |
| 5,688,707 | * 11/1997 | Lee et al. .......................... 438/20 |
| 5,716,871 | * 2/1998 | Yamazaki et al. .................. 438/297 |
| 5,872,052 | * 2/1999 | Iyer .................................. 438/624 |
| 5,894,189 | * 4/1999 | Ogasawara et al. ............... 313/310 |

FOREIGN PATENT DOCUMENTS

| 798761 | 10/1997 | (EP) . |
| 913849 | 5/1999 | (EP) . |
| 6-89891 | 3/1994 | (JP) . |
| 8-162668 | 6/1996 | (JP) . |
| 8-250766 | 9/1996 | (JP) . |

OTHER PUBLICATIONS

Thompson et al., "Room Temperature Oxidation Enhancement of Porous Si(001) using Ultraviolet–ozone Exposure", pp. 5415–5421.

Sheng et al. "Quasi–Ballistic Stable Electron Emission from Porous Silicon Cold Cathodes" Mat. Res. Soc., Symposium Proceedings vol. 509, pp. 193–198 (XP000881179).

Gelloz et al. "Enhancement of the Quantum Efficiency and Stability of Electroluminescence From Porous Silicon By Anodic Passivation" Applied Physics Letters, American Institute of Physics, New York, vol. 73, No. 14, pp. 2021 through 2023, Oct. 5, 1998 (XP000788506).

Sheng et al. "Operation of Electroluminescent Porous Silicon Diodes As Surface–Emitting Cold Cathodes" Thin Solid Films, vol. 297, Nos. 1–2, pp. 413–316, 1997; Elsevier Sequoia S.A. Lausanne (XP004085100).

English language abstract of JP 6–89891.
English language abstract of JP 8–162668.
English language abstract of JP 8–250766.

S. Billat, "Electroluminescence of Heavily Doped p–Type Porous Silicon under Electrochemical Oxidation in Galvanostatic Regime", J. Electrochem. Soc., vol. 143, No. 3, Mar. 1996.

* cited by examiner

*Primary Examiner*—Kenneth J. Ramsey
(74) *Attorney, Agent, or Firm*—Greenblum & Bernstein, P.L.C.

(57) ABSTRACT

A field emission type electron source 10 is provided with an n-type silicon substrate 1, a strong field drift layer 6 formed on the n-type silicon substrate 1 directly or inserting a polycrystalline silicon layer 3 therebetween, and an electrically conductive thin film 7, which is a thin gold film, formed on the strong field drift layer 6. Further, an ohmic electrode 2 is provided on the back surface of the n-type silicon substrate 1. Hereupon, electrons, which are injected from the n-type silicon substrate 1 into the strong field drift layer 6, drift in the strong field drift layer 6 toward the surface of the layer, and then pass through the electrically conductive thin film 7 to be emitted outward. The strong field drift layer 6 is formed by making the polycrystalline silicon 3 formed on the n-type silicon substrate 1 porous by means of an anodic oxidation, and further oxidizing it using dilute nitric acid or the like.

44 Claims, 12 Drawing Sheets

FIELD EMISSION-TYPE ELECTRON SOURCE AND MANUFACTURING METHOD THEREOF AND DISPLAY USING THE ELECTRON SOURCE

BACKGROUND OF THE INVENTION

1. Field of the Invention

The present invention relates to a field emission-type electron source for emitting electron beams by means of electrical field emission and a manufacturing method thereof, and to a display using the field emission-type electron source.

2. Description of the Prior Art

Conventionally, as a field emission-type electron source, there has been well-known a so-called Spindt-type electrode which is disclosed, for example, in the U.S. Pat. No. 3,665,241 and so on. The Spindt-type electrode is provided with a substrate on which many small (fine) emitter chips of triangular pyramid shape are disposed, emitting holes for exposing apexes of the emitter chips to the outside, and gate layers disposed in such a manner so as to be insulated to the emitter chips. Thus, the Spindt-type electrode can emit electron beams from the apexes of the emitter chips to the outside through the emitting holes by applying high voltage between the emitter chips and the gate layers under a vacuum atmosphere in such a manner that the emitter chips become negative electrodes against the gate layers.

However, in the Spindt-type electrode, there exists such a problem that when it is applied, for example, to a flat light emitter or a display, it is difficult to enlarge its area (electron emitting area), because manufacturing process of the electrode is complicated and further it is difficult to produce many emitter chips or triangular shape with higher efficiency. Meanwhile, in the Spindt-type electrode, the electrical field converges to the apexes of the emitter chips. Therefore, when the degree of vacuum around the apexes of the emitter chips is lower so that residual gas exists thereabout, the residual gas is ionized by the emitted electrons to become positive ions so that the positive ions collide to the apexes of the emitter chips. Accordingly, the apexes of the emitter chips suffer damages (for example, damages due to ion impacts) so that there may be caused such a problem that current density or efficiency of the emitted electrons become unstable, or lives of the emitter chips are shortened. Therefore, the Spindt-type electrode must be used under a higher vacuum atmosphere (about $10^{-5}$ Pa to about $10^{-6}$ Pa) in order to prevent occurrence of the above-mentioned problem. Accordingly, there may be caused such a disadvantage that the manufacturing cost of the electrode is raised and further the method of treatment of the electrode is troublesome.

In order to improve the above-mentioned disadvantage, a field emission-type electron source of MIM (Metal Insulator Metal) style or MOS (Metal Oxide Semiconductor) style has been proposed. The former is a flat field emission-type electron source having a laminated structure of (metal)-(insulator film)-(metal), while the latter is a flat field emission-type electron source having a laminated structure of (metal)-(oxide film)-(semiconductor). In order to raise electron-emitting efficiency of the above-mentioned type of field emission-type electron source (namely, in order to emit more electrons), it is necessary to reduce the thickness of the insulator film or oxide film. However, if the thickness of the insulator film or oxide film becomes thinner to excess, it is feared that dielectric breakdown is caused when voltage is applied between the upper and lower electrodes of the laminated structure. Therefore, there may be a certain restriction on reducing the thickness of the insulator film or oxide film. Thus, there exists such a disadvantage that its electron emitting efficiency (electron extracting efficiency) can not be raised so much, because the above-mentioned dielectric breakdown must be prevented.

Moreover, in recent years, as disclosed in the Japanese Laid-Open Patent Publication No. 8-250766, there has been proposed another field emission-type electron source (semiconductor element for emitting cold electrons), in which a porous semiconductor layer (porous silicon layer) is formed by performing anodic oxidation to one surface of a monocrystalline semiconductor substrate such as a silicon substrate in order to raise its electron emitting efficiency, a thin metal film being formed on the porous semiconductor layer. Hereupon, the electron source can emit electrons when voltage is applied between the semiconductor substrate and the thin metal film.

However, in the field emission-type electron source disclosed in the Japanese Laid-Open Patent Publication No. 8-250766, there exists such a disadvantage that it is difficult to enlarge its area and to lower its manufacturing cost, because the material of the substrate must be restricted to semiconductor. Meanwhile, in the field emission-type electron source, because a so-called popping phenomenon is easily caused when electrons are emitted, the amount of emitted electrons tends to become unsteady. Accordingly, when the electron source is applied to a flat light emitter or a display, there may be caused such a disadvantage that light emission becomes unsteady.

Thus, in the Japanese Patent Applications of No. 10-272340, No. 10-272342 and No. 10-271876 etc., the inventors of the present application have proposed another field emission-type electrode source including a strong field drift layer through which electrons injected from an electrically conductive substrate can drift, the layer being disposed between the electrically conductive substrate and a thin metal film, and the layer being formed by oxidizing a porous polycrystalline silicon layer by means of the Rapid Thermal Oxidation method (RTO method).

Hereupon, the porous polycrystalline silicon layer is formed by making a polycrystalline silicon layer on an electrically conductive substrate porous by means of an anodic oxidation treatment. Meanwhile, the oxidation of the porous polycrystalline silicon layer by the RTO method is performed in a dry oxygen atmosphere using a lamp annealing apparatus. In this case, temperature of the oxidation may be 800–900° C., and time of the oxidation may be 30–120 minutes (Japanese Patent Application No. 10-271876). Further, the thin metal film is formed using a thin gold film of about 10 nm thickness, because electrons (the electrons are considered as hot electrons), which have reached the surface of the strong field drift layer, must be emitted to the vacuum atmosphere in such a manner that they have passed through the thin metal film without being dispersed therein. In the field emission-type electron source, electrons can be stably emitted, because its electron emitting property has a smaller dependency to the degree of vacuum, and further a popping phenomenon is not caused when the electrons are emitted. Further, in addition to a semiconductor substrate such as a monocrystalline silicon substrate, there may be used a substrate in which an electrically conductive film (for example, ITO film) is provided on a surface of a glass substrate or the like, as the above-mentioned electrically conductive substrate. Therefore, in the field emission-type electron source, its area may be enlarged and its manufacturing cost may be lowered, in comparison with the conventional electron source utilizing the porous semiconductor layer produced by making the semiconductor substrate porous, or the Spindt-type electrode. Hereupon, when a display is produced using this type of field emission-type electron source, the thin metal film must be patterned to a predetermined shape.

However, in the field emission-type electron source disclosed in the Japanese Patent Application of No. 10-272340, No. 10-272342 or No. 10-271876, the temperature of the oxidation by the RTO method can not be raised over the heat resistant temperature of the electrically conductive substrate. Therefore, there exists such a disadvantage that materials of the substrate or the electrically conductive film are restricted so that enlarging the diameter (area) of the substrate is also restricted.

Meanwhile, in the field emission-type electron source disclosed in the Japanese Patent Application of No. 10-272340, No. 10-272342 or No. 10-271876, the porous polycrystalline silicon layer, which has been formed by oxidizing the polycrystalline silicon layer by means of the anodic oxidation treatment, is oxidized by means of the RTO method. Hereupon, as an electrolyte solution used in the anodic oxidation treatment, there may be used a solution in which hydrogen fluoride aqueous solution and ethanol are mixed together in the ratio of 1:1.

Hereupon, in the porous semiconductor layer (porous polycrystalline silicon layer or porous monocrystalline silicon layer) formed by the anodic oxidation treatment, silicon atoms are terminated by hydrogen atoms. Therefore, as disclosed in the Japanese Patent Application of No. 10-272340, No. 10-272342 or No. 10-271876, if an oxidized film is grown by the RTO method in the porous semiconductor layer formed by the anodic oxidation treatment, hydrogen atoms may remain in the oxidized film, or Si—OH bonds may be produced. In consequence, there exists such a disadvantage that it is difficult to form an minute oxidized film having $SiO_2$ structure so that its breakdown voltage is lowered. Further, because the strong field drift layer contains relatively much hydrogen, hydrogen distribution in the strong field drift layer may change with the lapse of time (For example, hydrogen atoms drop out from the surface of the strong field drift layer.). Therefore, it is feared that the stability of the electron emitting efficiency as to time passing is deteriorated.

Thus, in the field emission-type electron source disclosed in the Japanese Patent Application of No. 10-272340, No. 10-272342 or No. 10-271876, although its cost can be lowered and electrons can be stably emitted with high efficiency in comparison with the field emission-type electron source disclosed in the Japanese Laid-Open Patent Publication No. 8-250766, it is expected to improve the electron emitting efficiency further more.

SUMMARY OF THE INVENTION

The present invention, which has been performed to solve the conventional problems described above, has an object to provide a field emission-type electron source which can easily enlarge its area (electron emitting area) an lower its cost and a manufacturing method thereof, and to provide a display using the source.

Further, the present invention has another object to provide a field emission-type electron source in which the change of the electron emitting efficiency as to time passing is smaller and its breakdown voltage is higher, and a manufacturing method thereof.

Moreover, the present invention has a further object to provide a field emission-type electron source of lower cost which can stable emit electrons with high efficiency, and a manufacturing method thereof.

According to a first aspect of the present invention, which is performed to achieve the objects described above, there is provided a field emission-type electron source including an electrically conductive substrate, a strong field drift layer formed on a surface of the electrically conductive substrate and an electrically conductive thin film formed on the strong field drift layer, wherein electrons, which are injected into the electrically conductive substrate, drift in the strong field drift layer to be emitted outward through the electrically conductive thin film by applying voltage between the electrically conductive thin film and the electrically conductive substrate in such a manner that the electrically conductive thin film acts as a positive electrode against the electrically conductive substrate, wherein the strong field drift layer is formed by a process including an oxidation step of oxidizing a porous semiconductor layer at relatively lower temperature.

In the field emission-type electron source, it is preferable that the strong field drift layer is oxidized in a liquid phase in the oxidation step. Further, it is preferable that the porous semiconductor layer is formed by performing an anodic oxidation to a semiconductor layer. In the field emission-type electron source, its process temperature is lower than that of the conventional field emission-type electron source, in which the strong field drift layer is formed by oxidizing the porous semiconductor layer using the RTO method. Accordingly, restriction of materials usable for the electrically conductive substrate becomes smaller so that enlarging the area (electron emitting area) and lowering the manufacturing cost of the field emission-type electron source may be easily achieved.

According to a second aspect of the present invention, there is provided a method of manufacturing a field emission-type electron source including an electrically conductive substrate, a strong field drift layer formed on a surface of the electrically conductive substrate and an electrically conductive thin film formed on the strong field drift layer, wherein electrons, which are injected into the electrically conductive substrate, drift in the strong field drift layer to be emitted outward through the electrically conductive thin film by applying voltage between the electrically conductive thin film and the electrically conductive substrate in such a manner that the electrically conductive thin film acts as a positive electrode against the electrically conductive substrate, the method including a main oxidation step of forming a strong field drift layer by oxidizing a porous semiconductor layer at relatively lower temperature.

In the main oxidation step, the porous semiconductor layer may be oxidized in an electrolyte solution by means of an electrochemical reaction. As the electrolyte solution, for example, an acid solution may be used. In this case, the process temperature of the manufacturing method is lower than that of the conventional manufacturing method, in which the strong field drift layer is formed by oxidizing the porous semiconductor layer using the RTO method. Accordingly, restriction for materials usable for the electrically conductive substrate becomes smaller so that a field emission-type electron source with a larger area may be manufactured at lower cost. Further, because the porous semiconductor layer is oxidized by means of a wet process, the manufacturing process may be simplified in comparison with the conventional manufacturing method.

Further, a supplemental oxidation step by means of a heating process (preferably rapid heating process, in consequence hereinafter it is referred to rapid heating process although it includes a mere heating process) may be performed before and/or after the main oxidation step.

Meanwhile, before the main oxidation step or before the main oxidation step and supplemental oxidation step, a pre oxidation step of oxidizing the porous semiconductor layer using an oxidant solution may be performed. In this case, hydrogen atoms, which terminate the atom group on the surface of the porous semiconductor layer, for example, formed by an anodic oxidation, are substituted with oxygen atoms by the oxidant solution. Accordingly, the amount of hydrogen contained in the strong field drift layer becomes less. In consequence, time-dependent change of hydrogen distribution in the strong field drift layer becomes smaller so that time-dependent stability of the field emission-type electron source may be improved.

Moreover, in the main oxidation step, the porous semiconductor layer may be oxidized by means of at least one of a treatment which applies ultraviolet rays to the porous semiconductor layer in a gas atmosphere containing at least one of oxygen and ozone, a treatment which exposes the porous semiconductor layer to plasma in a gas atmosphere containing at least one of oxygen and ozone, a treatment which heats the porous semiconductor layer in a gas atmosphere containing ozone, a treatment which applies ultraviolet rays to the porous semiconductor layer and heats the porous semiconductor layer, and a treatment which applies ultraviolet rays to the porous semiconductor layer in a gas atmosphere containing at least one of oxygen and ozone and heats the porous semiconductor layer. In this case, electron emitting efficiency of the electron source may be raised in comparison with that of the electron source manufactured by the conventional manufacturing method, in which the strong field drift layer is formed by oxidizing the porous semiconductor layer using the RTO process. Further, because the process temperature is lower, restriction for materials usable for the electrically conductive substrate becomes smaller so that a field emission-type electron source with a larger electron emitting area may be manufactured at lower cost.

Further, if the main oxidation step is performed after the electrically conductive thin film has been formed, contamination due to organic materials produced in the processes before the present oxidation may be removed. In consequence, there may be also obtained such an effect that the electron emitting property is improved.

Hereupon, before and/or after the main oxidation step, there may be performed a supplemental oxidation step of oxidizing the porous semiconductor layer by means of a rapid heating process, a further supplemental oxidation step of oxidizing the porous semiconductor layer using an acid solution, or the both supplemental oxidation steps described above. In this case, the electron emitting efficiency may be raised much more.

Further, before the main oxidation step (in the case of including no supplemental oxidation), or before the main oxidation step and the supplemental oxidation step(s), there may be performed a pre oxidation step of oxidizing the porous semiconductor layer using an oxidant solution. In this case, as described above, because hydrogen atoms, which terminate the atom group on the surface of the porous semiconductor layer are substituted with oxygen atoms by the oxidant solution, the amount of hydrogen contained in the strong field drift layer becomes less so that time-dependent stability of the field emission-type electron source may be improved.

Meanwhile, the pre-oxidation step may be performed before the oxidation step by means of the rapid heating process.

In each of the above-mentioned manufacturing methods, the porous semiconductor layer may be a porous monocrystalline silicon layer or a porous polycrystalline silicon layer. The electrically conductive substrate may be an n-type silicon substrate. Further, the electrically conductive substrate may be a substrate in which an electrically conductive film is formed on a surface of an insulating plate such as, for example, a glass plate, a ceramic plate or the like. The porous semiconductor layer may be formed by performing an anodic oxidation to a semiconductor layer.

In each of the above-mentioned manufacturing methods, it is preferable that the acid solution, which is used in the main oxidation step or the supplemental oxidation step, is dilute nitric acid, dilute sulfuric acid or aqua regia. Further, it is preferable that the oxidant solution, which is used in the pre oxidation step, is any one of or a mixture of plural ones of concentrated nitric acid, concentrated sulfuric acid, hydrochloric acid and hydrogen peroxide. Hereupon, it is preferable that the oxidant solution is used in a heated state in order to shorten processing time of the pre oxidation step so as to improve its through put.

According to a third aspect of the present invention, there is provided a display for displaying an image on a screen thereof, including any one of the field emission-type electron sources described above, a collector electrode disposed so as to face the field emission-type electron source, a fluorescent disposed on a surface of the collector electrode, the surface facing the field emission-type electron source, and a member for applying voltage between the collector electrode and an electrically conductive thin film of the field emission-type electron source, wherein when voltage is applied between the collector electrode and the electrically conductive thin film, the image is displayed on the screen by colliding electrons emitted from the field emission-type electron source to the fluorescent so as to make the fluorescent emit light.

BRIEF DESCRIPTION OF THE DRAWINGS

The present invention will become more fully understood from the detailed description given below and the accompanied drawings, wherein.

DETAILED DESCRIPTION OF THE PREFERRED EMBODIMENTS

Hereinafter, preferred embodiments of the present invention will be concretely described.

Embodiment 1

Figure 1A:
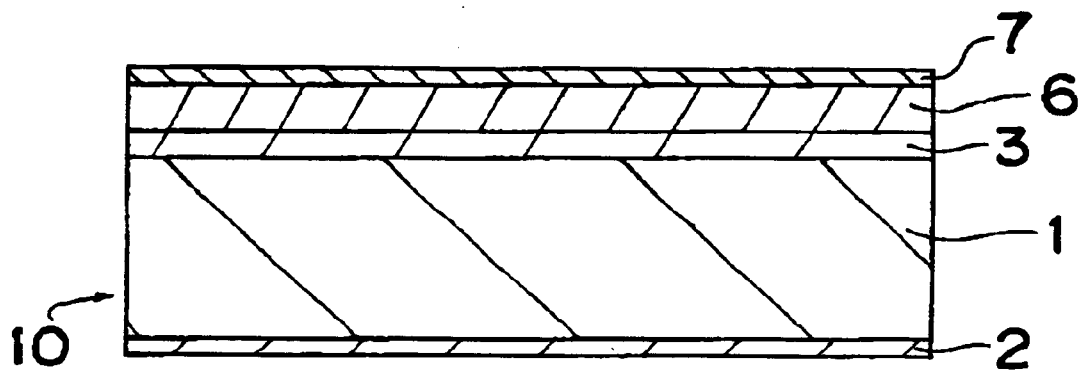
FIG. 1A is an elevational section view of a field emission-type electron source according to the present invention, in which the electrically conductive substrate is composed of an n-type silicon substrate.

FIG. 1A shows an elevational section of a field emission-type electron source, in which the electrically conductive substrate is composed of an n-type silicon substrate. Hereupon, the n-type silicon substrate is composed of a (100) substrate whose electrical resistivity is about 0.1 Ωcm. As shown in FIG. 1A, the field emission-type electron source 10 is provided with an n-type silicon substrate 1, a non-doped polycrystalline silicon layer 3 formed on a surface of the n-type silicon substrate 1, a strong field drift layer 6 formed on the polycrystalline silicon layer 3, and an electrically conductive thin film 7 formed on the strong field drift layer 6, the thin film 7 being composed of a thin gold film. Further, an ohmic electrode 2 is provided on the back surface of the n-type silicon substrate 1.

Thus, in the field emission-type electron source 10, the n-type silicon substrate 1 is used as an electrically conductive substrate. Hereupon, the electrically conductive substrate is intended to construct a negative electrode of the field emission-type electron source 10, to support the strong field drift layer 6 in a vacuum space, and further to inject electrons into the strong field drift layer 6. Therefore, the electrically conductive substrate need not be restricted to the n-type silicon substrate, if only it is capable of constructing the negative electrode of the field emission-type electron source 10 and supporting the strong field drift layer 6. For example, the electrically conductive substrate may be composed of metal such as chrome.

Figure 1B:
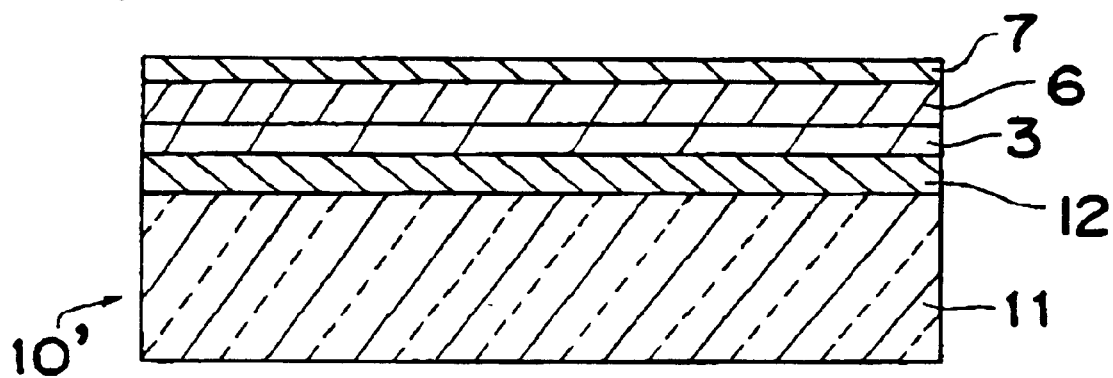
FIG. 1B is an elevational section view of a field emission-type electron source according to the present invention, in which the electrically conductive substrate is composed of a substrate in which an electrically conductive film is formed on a glass plate.

Moreover, as shown in FIG. 1B, the electrically conductive substrate may be composed of a substrate in which an electrically conductive film 12 (for example, ITO film) is formed on a surface of an insulating plate 11 such as a glass plate (or a ceramic plate). In this case, it would be possible to enlarge the electron emitting area of the field emission-type electron source and to lower the manufacturing cost of the source, in comparison with the case using the semiconductor substrate.

The strong field drift layer 6, which is formed by oxidizing a porous polycrystalline silicon using an acid solution, is a layer into which electrons are injected when voltage is applied between the electrically conductive substrate and the electrically conductive thin film (thin metal film). The strong field drift layer 6 is composed of a polycrystalline body including many grains. On a surface of each of the grains, a structure of nano meter order having an oxide film (hereinafter, being referred to "nano structure") exists. It is required that the dimension of the nano structure is smaller than the mean free path of the electron in the monocrystalline silicon, that is about 50 nm, in order to make electrons injected into the strong field drift layer 6 reach the surface of the strong field drift layer 6 without colliding the electrons to the nano structure (namely, without causing dispersion of electrons). Concretely, it is preferable that the dimension of the nano structure is smaller than 10 nm, and further it is more preferable that the dimension is smaller than 5 nm.

In Embodiment 1, the electrically conductive thin film 7 (thin metal film) is composed of a thin gold film. The electrically conductive thin film 7 is intended to construct a positive electrode of the field emission-type electron source 10, and to apply electrical field to the strong field drift layer 6. Electrons, which have reached the surface of the strong field drift layer 6 by applying the electrical field, are emitted outward from the surface of the electrically conductive thin film 7 by means of the tunnel effect. Hereupon, an ideal energy of the emitted electrons is the energy difference obtained by subtracting the energy of the work function of the electrically conductive thin film 7 from the energy of the electrons obtained by applying DC voltage between the electrically conductive substrate and the electrically conductive thin film 7. Therefore, the smaller the work function of the electrically conductive thin film 7 is, it is more desirable.

In Embodiment 1, although gold is used as a material of the electrically conductive thin film 7, the material need not be restricted to gold. Any metal may be used as the material, if only its work function is small. For example, aluminum, chrome, tungsten, nickel, platinum or the like may be used. The work function of each of the metals described above is as follows.

Gold: 5.10 eV

Chrome: 4.50 ev

Nickel: 5.15 eV

Aluminum: 4.28 eV

Tungsten: 4.55 eV

Platinum: 5.65 eV

Hereinafter, a manufacturing process of a field emission-type electron source 10 will be described, while referring to FIGS. 2A to 2D.

Figure 2A:
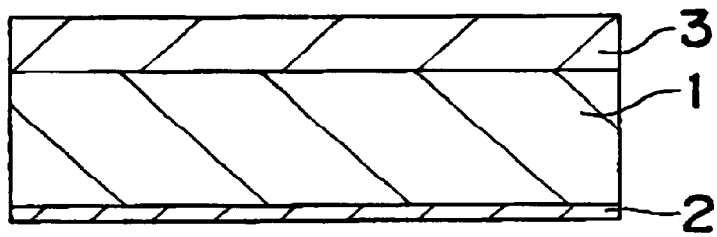
FIGS. 2A to 2D are elevational section views of intermediate products or a final product in the main steps of the manufacturing process of the field emission-type electron source shown in FIG. 1A.

In the manufacturing process, after an ohmic electrode 2 has been formed on the back surface of an n-type silicon substrate 1 at first, a non-doped polycrystalline silicon layer 3 of about 1.5 μm thickness is formed on the n-type silicon layer 1 so that the structure shown in FIG. 2A is obtained. The film making process of the polycrystalline silicon layer 3 is performed by means of the LPCVD process. In the film making process, degree of vacuum is set to 20 Pa, temperature of the substrate is set to 640° C., and flow rate of monosilane gas is set to 600 sccm. Hereupon, if the electrically conductive substrate is a semiconductor, the film making process of the polycrystalline silicon layer 3 may be performed by means of the LPCVD process or the sputtering process. Alternatively, the film making process may be performed by annealing an amolphous silicon film so as to be crystallized, the amolphous silicon film having been formed by the plasma CVD process.

If the electrically conductive substrate is a substrate in which an electrically conductive film is formed on a glass plate, the polycrystalline silicon layer may be formed by annealing an amolphous silicon film using an excimer laser, the amolphous silicon film having been formed on the electrically conductive film by the CVD process. Because the process for forming the polycrystalline silicon layer 3 on the electrically conductive film need not be restricted to the CVD process, there may be used, for example, the CGS (Continuous Grain Silicon) process or the catalytic CVD process.

Figure 2B:
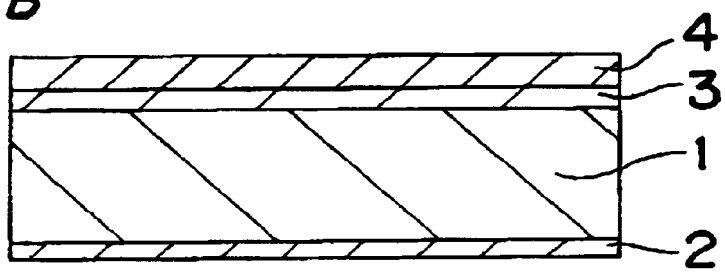

After the non-doped polycrystalline silicon layer 3 has been formed, a porous polycrystalline silicon layer 4 is formed by performing an anodic oxidation treatment to the polycrystalline silicon layer 3 using an anodic oxidation processing tank containing electrolyte composed of a mixture in which hydrogen fluoride aqueous solution of 55 wt % and ethanol are mixed together in the ratio of nearly 1:1. The anodic oxidation treatment is performed with constant current while applying light to the layer 3 in such a manner that a platinum electrode (not shown) acts as a negative electrode and the n-type silicon substrate 1 (ohmic electrode 2) acts as a positive electrode. Thus, the structure shown in FIG. 2B is obtained. Hereupon, in the anodic oxidation treatment, current density is set to the constant value of 10 mA/cm², and time of the anodic oxidation step is set to 30 seconds. Further, during the anodic oxidation treatment, light is applied to the surface of the polycrystalline silicon layer 3 using a tungsten lamp of 500 W. In consequence, the porous polycrystalline silicon layer 4 of nearly 1 μm thickness is formed. Although only a part of the polycrystalline silicon layer 3 is crystallized in this case, the whole polycrystalline silicon layer 3 may be crystallized.

Figure 2C:
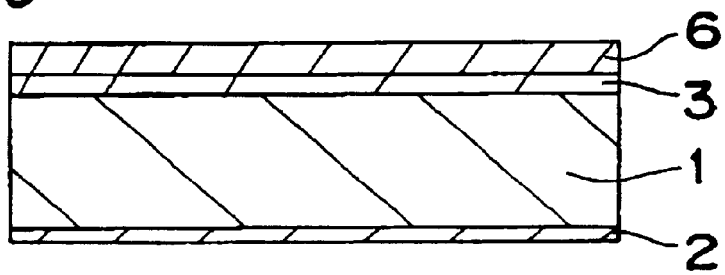
Figure 2D:
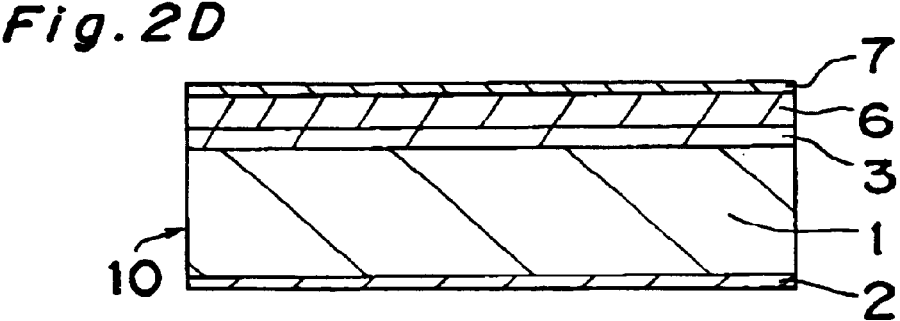

After the anodic oxidation treatment has been completed, the electrolyte is removed from the anodic oxidation processing tank, and then dilute nitric acid of nearly 10% concentration is newly put into the anodic oxidation processing tank. Then, using the anodic oxidation processing tank containing dilute nitric acid, the porous polycrystalline silicon layer 4 is oxidized by letting constant current flow between the platinum electrode (not shown) and the n-type silicon substrate 1 (ohmic electrode 2) in such a manner that the platinum electrode acts as a negative electrode and the silicon substrate 1 acts as a positive electrode. Thus, the structure shown in FIG. 2C is obtained. In FIG. 2C, the numeral 6 denotes a strong field drift layer formed by oxidizing the porous polycrystalline silicon layer 4 using acid (dilute nitric acid in this case).

Hereupon, it may be considered that when the porous polycrystalline silicon layer 4 is oxidized by dilute nitric acid, there occur such reactions as shown by the following reaction formulas 1 and 2. In the reaction formulas, $h^+$ denotes a hole, and $e^-$ denotes an electron.

(Negative electrode)

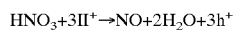

$$HNO_3 + 3H^+ \rightarrow NO + 2H_2O + 3h^+ \quad \text{reaction formula 1}$$

(Positive electrode)

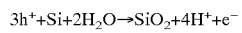

$$3h^+ + Si + 2H_2O \rightarrow SiO_2 + 4H^+ + e^- \quad \text{reaction formula 2}$$

Figure 3:
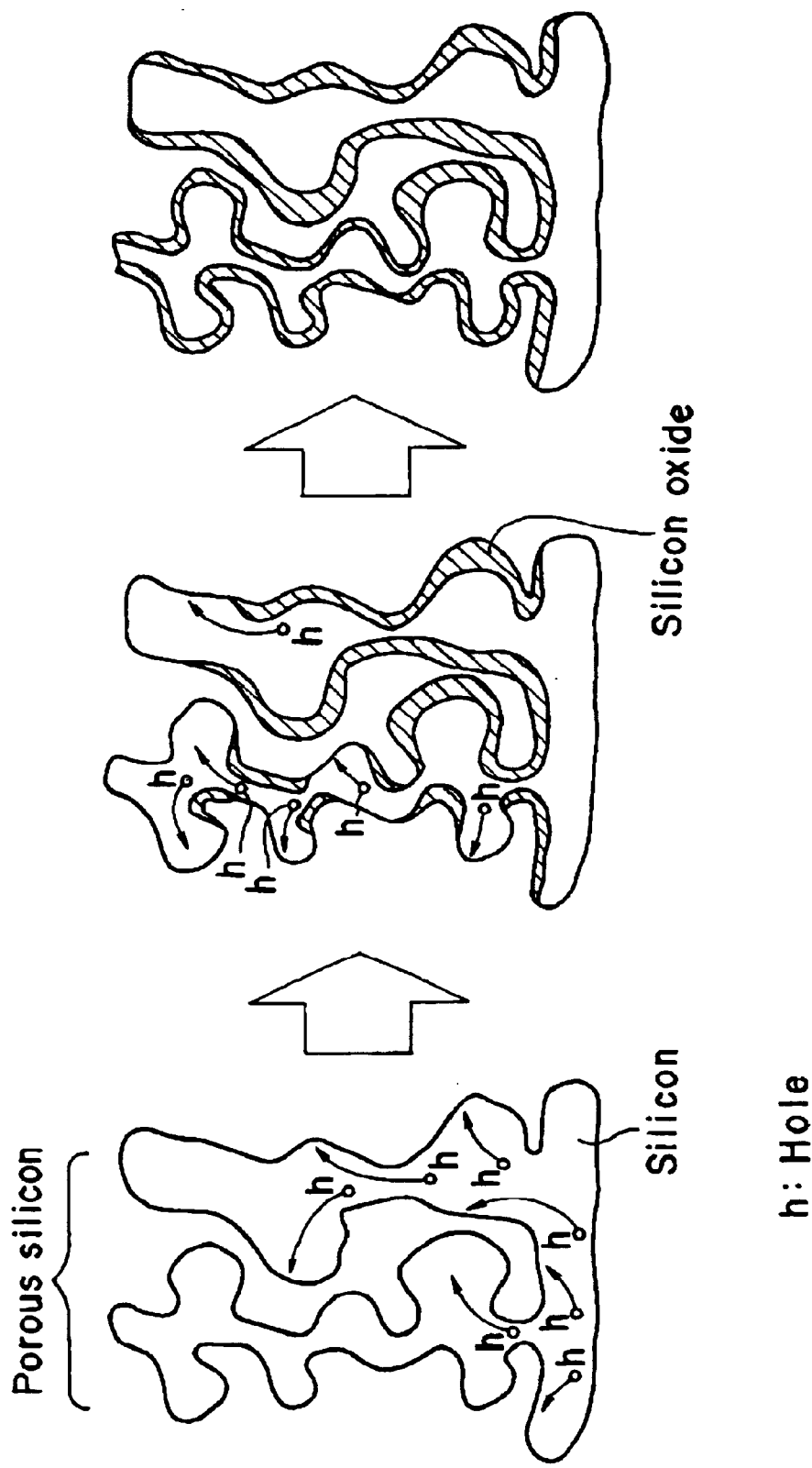
FIG. 3 is a schematic view showing an outline of a electrochemical oxidation process in a porous silicon.

As shown schematically in FIG. 3, silicon oxide ($SiO_2$) is formed on the surfaces of pores of the porous polycrystalline silicon layer 4 due to the above-mentioned reactions. Further, the concentration of dilute nitric acid or the current density (constant value) may be conveniently changed in correspondence with any desired thickness or quality etc. of the porous polycrystalline silicon layer 4 which is to be oxidized.

Further, the potential voltage at the end point may be set to a preferable (optimum) value, for example, in the range of several V to several tens V. Moreover, the applied light or the temperature may be conveniently set to a preferable value.

Hereupon, as to the strong field drift layer 6, it may be considered that the surface of the fine silicon crystal composed of the nano structure, which is formed by means of the anodic oxidation treatment, is oxidized by dilute nitric acid.

Figure 4:
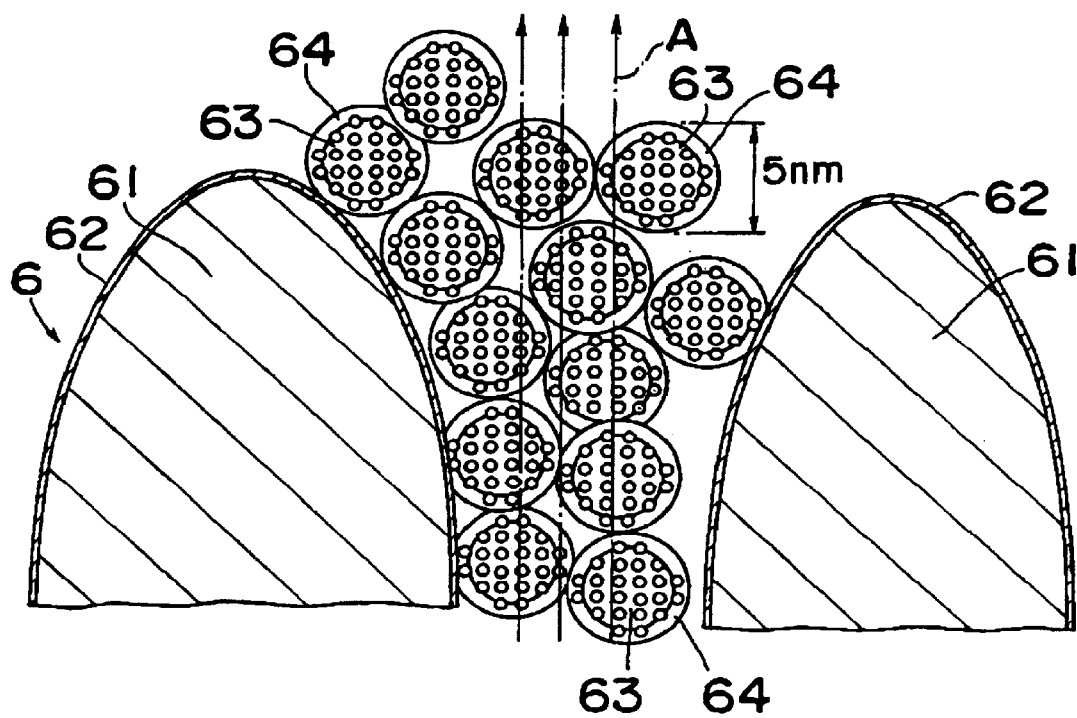
FIG. 4 is a view showing a principle of an electron-emitting mechanism in the field emission-type electron source shown in FIG. 1A.

As shown in FIG. 4, it may be considered that the strong field drift layer 6 includes at least pillar-shaped polycrystalline silicon grains 61, thin silicon oxide films 62 formed on the surfaces of the polycrystalline silicon grains 61, fine crystalline silicon layers 63 existing among the polycrystalline silicon grains 61, and silicon oxide films 64 formed on the surfaces of the fine crystalline silicon layers 63.

In Embodiment 1, because the porous polycrystalline silicon layer 4 is oxidized using acid (dilute nitric acid), the process temperature is lower than that of the conventional manufacturing process (disclosed in Japanese Patent Applications of No. 10-272340, No. 10-272342 or No. 10-271876 by the inventors of the present application), in which the strong field drift layer is formed by oxidizing the porous semiconductor layer by means of the RTO process. Accordingly, restriction of materials usable for the electrically conductive substrate becomes smaller so that the field emission-type electron source may have a larger electron emitting area and may be manufactured at lower cost. Further, because the porous polycrystalline silicon layer 4 is oxidized by means of the wet process after the anodic oxidation treatment, the manufacturing process may be simplified in comparison with the case of oxidizing the layer 4 by means of the RTO process after the anodic oxidation treatment.

After the strong field drift layer 6 has been formed, an electrically conductive thin film 7, which is composed of a thin gold film, is formed on the strong field drift layer 6, for example, by means of the vapor deposition process. Thus, there is obtained such a field emission-type electron source 10 having the structure shown in FIG. 2D (FIG. 1A). Although the thickness of the electrically conductive thin film 7 is set to nearly 10 nm in Embodiment 1, the thickness need not be restricted to that. Hereupon, in the field emission-type electron source 10, there is formed a diode in which the electrically conductive thin film acts as a positive electrode (anode) while the ohmic electrode 2 acts as a negative electrode (cathode). Meanwhile, although the electrically conductive thin film 7 (thin gold film) is formed by means of the vapor deposition process in Embodiment 1, the method of forming the electrically conductive thin film 7 need not be restricted to the vapor deposition process. For example, the sputtering process may be used.

It may be considered that in the field emission-type electron source 10 of Embodiment 1, electrons are emitted according to the following model.

Figure 5:
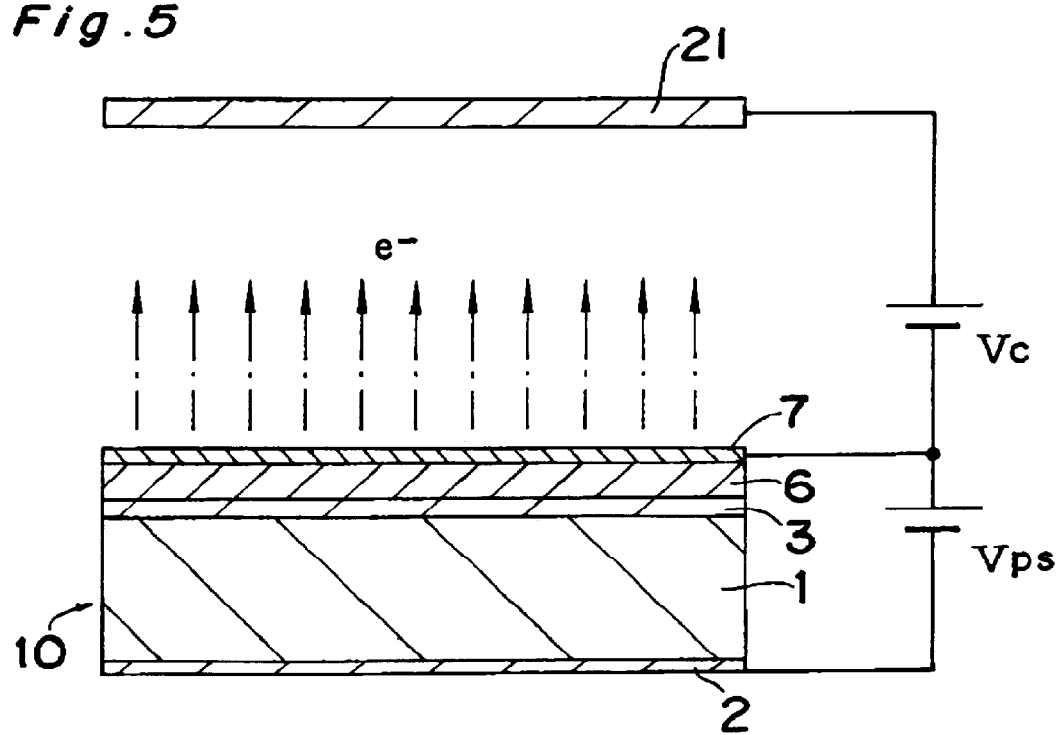
FIG. 5 is a view showing an electron-emitting action of the field emission-type electron source shown in FIG. 1A.

That is, as shown in FIG. 5, let us suppose that a collector electrode 21 is disposed so as to face the electrically conductive thin film 7, DC voltage Vps is applied between the electrically conductive thin film 7 and the ohmic electrode 2, and further DC voltage Vc is applied between the collector electrode 21 and the electrically conductive thin film 7. In that condition, when the DC voltage, which is applied to the electrically conductive thin film 7 in such a manner that the thin film 7 becomes a positive electrode against the n-type silicon substrate 1, reaches a predetermined value (critical value), electrons e⁻ are injected from the n-type silicon substrate 1 side to the strong field drift layer 6 by means of thermal excitation. On the other hand, because the electrical field, which is applied to the strong field drift layer 6, is mostly applied to the silicon oxide films 64, the injected electrons are accelerated by the strong electrical field applied to the silicon oxide films 64. Thus, within the strong field drift layer 6, the electrons drift in the direction indicated by an arrow A in FIG. 4 in the space among the polycrystalline silicon grains 61 toward the surface of the layer 6. Then, the electrons pass through the electrically conductive thin film 7 to be emitted into the vacuum after passing through the oxide layer on the uppermost surface of the strong field drift layer 6.

In the field emission-type electron source 10 manufactured according to the above-mentioned process, as same as the case of the field emission-type electron source proposed in the Japanese Patent Application of No. 10-272340, No. 10-272342 or No. 10-271876 by the inventors of the present application, electrons can be stably emitted, because its electron emitting property has a smaller dependency to the degree of vacuum, and further a popping phenomenon is not caused when the electrons are emitted. Further, in addition to a semiconductor substrate such as a monocrystalline silicon substrate, there may be used a substrate in which an electrically conductive film (for example, ITO film) is provided on a surface of a glass plate or the like, as the electrically conductive substrate. Therefore, in the field emission-type electron source, its electron emitting area can be enlarged and its manufacturing cost can be lowered, in comparison with the Spindt-type electrode.

Although both of the anodic oxidation treatment and the oxidation treatment using acid after the anodic oxidation treatment are performed using the same anodic oxidation processing tank in Embodiment 1, it is of course that each of the treatments may be performed using its individual anodic oxidation processing tank.

Embodiment 2

Hereinafter, Embodiment 2 of the present invention will be described. Hereupon, the fundamental construction of the field emission-type electron source and the manufacturing method thereof according to Embodiment 2 are nearly as same as those of Embodiment 1 except the following matters.

Namely, in Embodiment 2, after the anodic oxidation treatment has been completed, the electrolyte is removed from the anodic oxidation processing tank, and then dilute sulfuric acid of nearly 10% concentration is newly put into the anodic oxidation processing tank. Then, using the anodic oxidation processing tank containing dilute sulfuric acid, the porous polycrystalline silicon layer 4 is oxidized by letting constant current flow between the platinum electrode (not shown) and the n-type silicon substrate 1 (ohmic electrode 2) in such a manner that the platinum electrode acts as a negative electrode and the silicon substrate 1 acts as a positive electrode. That is, in Embodiment 2, the surface of the fine silicon crystal composed of the nano structure, which is formed by means of the anodic oxidation treatment, is oxidized by dilute sulfuric acid.

Hereupon, it may be considered that when the porous polycrystalline silicon layer 4 is oxidized by dilute sulfuric acid, there occur such reactions as shown by the following reaction formulas 3 and 4. In the reaction formulas, h⁺ denotes a hole, and e⁻ denotes an electron.

(Negative electrode)

$$H_2SO_4 + 2H^+ \rightarrow SO_2 + 2H_2O + 2h^+ \quad \text{reaction formula 3}$$

(Positive electrode)

$$2h^+ + Si + 2H_2O \rightarrow SiO_2 + 4H^+ + 2e^- \quad \text{reaction formula 4}$$

Hereupon, the concentration of dilute sulfuric acid or the current density may be conveniently changed in correspondence with any desired thickness or quality etc. of the porous polycrystalline silicon layer 4 which is to be oxidized.

Further, the potential voltage at the end point may be set to a preferable (optimum) value, for example, in the range of several V to several tens V. Moreover, the applied light or the temperature may be conveniently set to a preferable value.

Embodiment 3

Hereinafter, Embodiment 3 of the present invention will be described. Hereupon, the fundamental construction of the field emission-type electron source and the manufacturing method thereof according to Embodiment 3 are nearly as same as those of Embodiment 1 except the following matters.

Namely, in Embodiment 3, after the anodic oxidation treatment has been completed, the electrolyte is removed from the anodic oxidation processing tank, and then aqua regia ((concentrated hydrochloric acid):(concentrated nitric acid)=3:1) is newly put into the anodic oxidation processing tank. Thus, the porous polycrystalline silicon layer 4 is oxidized by aqua regia. Because silicon is gradually oxidized in aqua regia, the surface of the fine silicon crystal is oxidized by aqua regia which has permeated into the pores in the porous polycrystalline silicon layer 4 in Embodiment 3.

Thus, in Embodiments 1 to 3, the porosity of the porous polycrystalline silicon layer 4 is nearly uniform in the direction of thickness of the layer by making the current density constant during the anodic oxidation step. However, by changing the current density during the anodic oxidation step, there may be produced such a structure that porous polycrystalline silicon layers with larger porosity and porous polycrystalline silicon layer with smaller porosity are laminated by turns, or such a structure that the porosity successively changes in the direction of thickness of the layer.

Meanwhile, in Embodiments 1 to 3, the strong field drift layer 6 is formed by oxidizing the porous polycrystalline silicon layer using acid. However, the strong field drift layer may be formed using acid by oxidizing the porous polycrystalline silicon which is formed by making monocrystalline silicon porous by means of the anodic oxidation treatment.

Embodiment 4

Hereinafter, Embodiment 4 of the present invention will be described. In the field emission-type electron source 10 according to any one of Embodiments 1 to 3, the strong field drift layer 6 is formed by oxidizing the porous semiconductor layer (porous polycrystalline silicon layer 4 or porous monocrystalline silicon layer), which has been formed by means of the anodic oxidation treatment, using acid. Further, because the mixture solution, in which hydrogen fluoride aqueous solution and ethanol are mixed together, is used as an electrolyte in the anodic oxidation treatment, silicon atoms in the porous semiconductor layer are terminated by hydrogen atoms. Accordingly, because the hydrogen content in the strong field drift layer 6 becomes comparatively higher, the distribution of the hydrogen atoms changes with the lapse of time so that the stability of the electron emitting efficiency with time passing may deteriorated. For example, when the electrically conductive thin film 7 (thin gold film) is patterned on the strong field drift layer 6, hydrogen atoms may fall out from the strong field drift layer 6 so that the stability with time passing may be deteriorated. Further, because the silicon atoms in the porous semiconductor layer are terminated by the hydrogen atoms, it may be difficult to form a minute oxide film such as $SiO_2$.

On the other hand, in Embodiment 4, before the porous semiconductor layer (porous polycrystalline silicon layer 4 or porous monocrystalline silicon layer), which has been formed by means of the anodic oxidation treatment, is oxidized using acid (for example, dilute nitric acid, dilute sulfuric acid or aqua regia), namely before the silicon oxide film is electrochemically formed, hydrogen atoms which terminate silicon atoms are substituted with oxygen atoms by immerging the porous semiconductor layer in an oxidant solution for a time capable of oxidizing its very surface layer. Hereupon, as the above-mentioned oxidant solution, it is preferable to use any one or a mixture of plural ones selected in a group of oxidants composed of nitric acid ($HNO_3$), sulfuric acid ($H_2SO_4$), hydrochloric acid (HCl) and hydrogen peroxide ($H_2O_2$).

Figure 6A:
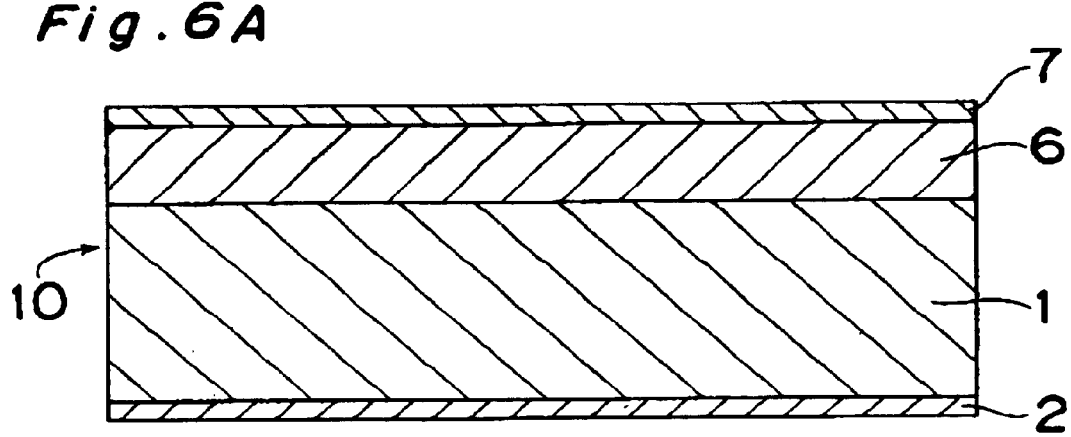
FIG. 6A is an elevational section view of another field emission-type electron source according to the present invention, in which the electrically conductive substrate is composed of an n-type silicon substrate.

Thus, in Embodiment 4, as shown in FIG. 6A, the strong field drift layer 6 is formed by oxidizing the porous semiconductor layer, whose very surface layer has been oxidized by the oxidant solution, using acid. Accordingly, when the porous semiconductor layer is formed by means of the anodic oxidation treatment, hydrogen atoms, which terminate atoms of the surface of the porous semiconductor layer, are substituted with oxygen atoms by the oxidant solution. In consequence, the hydrogen content in the strong field drift layer 6 becomes smaller, thereby the time-depending change of the hydrogen distribution in the strong field drift layer 6 becomes smaller so that the stability of the layer may be improved. Further, in Embodiment 4, because the oxide film produced by oxidizing the porous semiconductor layer using acid tends to form a $SiO_2$ structure or a structure similar to the $SiO_2$ structure, the minuteness and quality of the oxide film may be improved so that electron emitting efficiency is improved and further the breakdown voltage is raised. Hereupon, the function of the strong field drift layer 6 is as same as that of the strong field drift layer 6 in Embodiment 1.

Hereupon, if the oxidant solution is heated, process time of the oxidation treatment by means of the oxidant solution may be shortened so that its throughput may be improved.

Figure 6B:
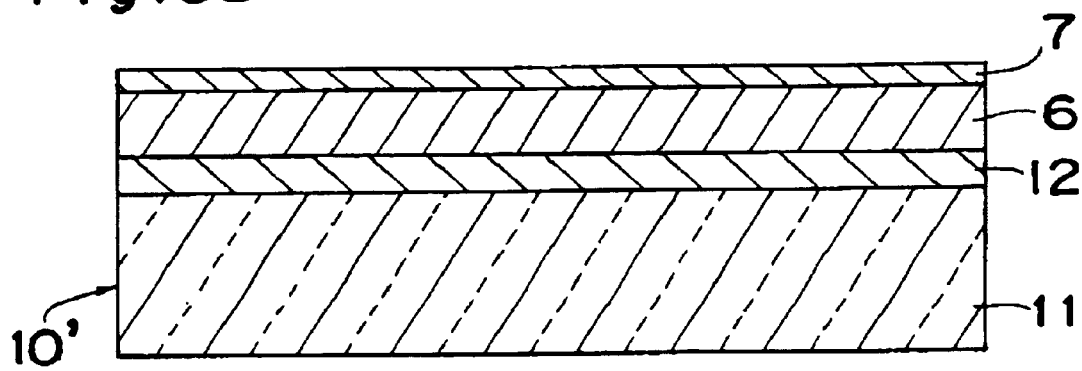
FIG. 6B is an elevational section view of another field emission-type electron source according to the present invention, in which the electrically conductive substrate is composed of a substrate in which an electrically conductive film is formed on a glass plate.

Moreover, as shown in FIG. 6B, as the electrically conductive substrate, there may be used a substrate in which a electrically conductive film 12 (for example, ITO film) is formed on a insulating plate 11 such as a glass plate (or ceramic plate). In this case, enlarging the electron emitting area of the field emission-type electron source and lowering the manufacturing cost of the source may be more easily achieved in comparison with the case using a semiconductor substrate.

Next, a manufacturing process of a field emission-type electron source according to Embodiment 4 will be described as an example, while referring to FIGS. 7A to 7D. However, because the manufacturing process is nearly as same as the manufacturing process described in Embodiment 1 (FIGS. 2A–2D), the members corresponding to members in Embodiment 1 are given the same numeral as same as those in Embodiment 1 so that the detailed description about them will be omitted. Further, as to the steps as same as those in Embodiment 1, the description about them will be simplified or omitted.

Figure 7A:
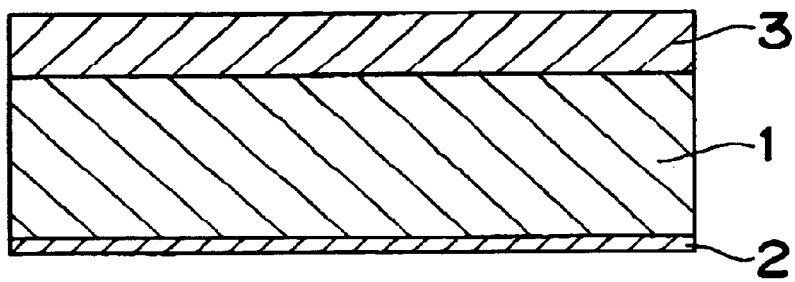
FIGS. 7A to 7D are elevational section views of intermediate products or a final product in the main steps of the manufacturing process of the field emission-type electron source shown in FIG. 6A.

In the manufacturing process according to Embodiment 4, as same as the case of Embodiment 1, after an ohmic electrode 2 has been formed on the back surface of an n-type silicon substrate 1, a non-doped polycrystalline silicon layer 3 of about 1.5 μm thickness is formed on the front surface of the n-type silicon layer 1 by means of the LPCVD process so that the structure shown in FIG. 7A is obtained. In Embodiment 4, the n-type silicon substrate 1 ((100) type of substrate), which is used as an electrically conductive substrate, has electrical resistivity of 0.01 to 0.02 Ωcm and thickness of 525 μm.

Figure 7B:
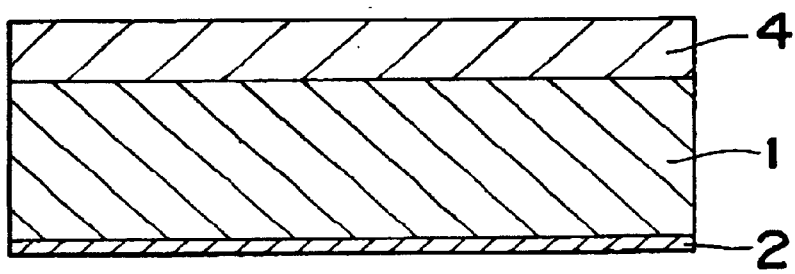

Then, a porous polycrystalline silicon layer 4 is formed by performing an anodic oxidation treatment to the polycrystalline silicon layer 3 using an anodic oxidation processing tank containing electrolyte composed of a mixture in which hydrogen fluoride aqueous solution of 55 wt % and ethanol are mixed together in the ratio of nearly 1:1. The anodic oxidation treatment is performed with constant current while applying light to the layer 3 in such a manner that a platinum electrode (not shown) acts as a negative electrode and the n-type silicon substrate 1 (ohmic electrode 2) acts as a positive electrode. Thus, the structure shown in FIG. 7B is obtained. In the anodic oxidation treatment, current density is set to the constant value of 30 mA/cm$^2$, and time of the anodic oxidation step is set to 10 seconds. Further, during the anodic oxidation treatment, light is applied to the surface of the polycrystalline silicon layer 3 using a tungsten lamp of 500 W. Hereupon, in Embodiment 4, the anodic oxidation treatment is performed in such a condition that only one area whose diameter is 10 mm in the surface of the polycrystalline silicon layer 3 contacts with the electrolyte, while the other area is sealed so as to be prevented from contacting with the electrolyte. Further, in Embodiment 4, the polycrystalline silicon layer 3 is wholly made porous.

Next, the very surface layer of the porous silicon layer 3 is oxidized by an oxidant solution. In Embodiment 4, as the oxidant solution, there is used nitric acid (concentrated nitric acid) heated up to 115° C., whose concentration is nearly 70%. Time oxidation is 10 minute.

Figure 7C:
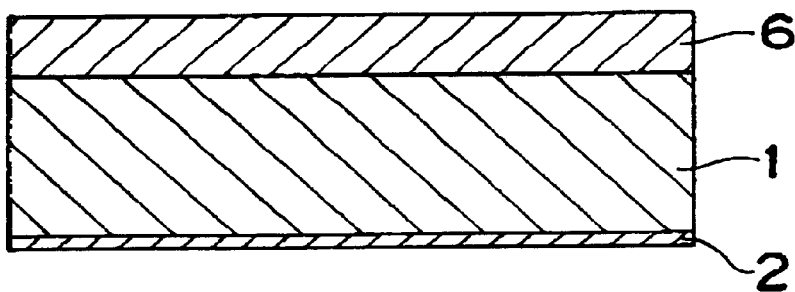
Figure 7D:
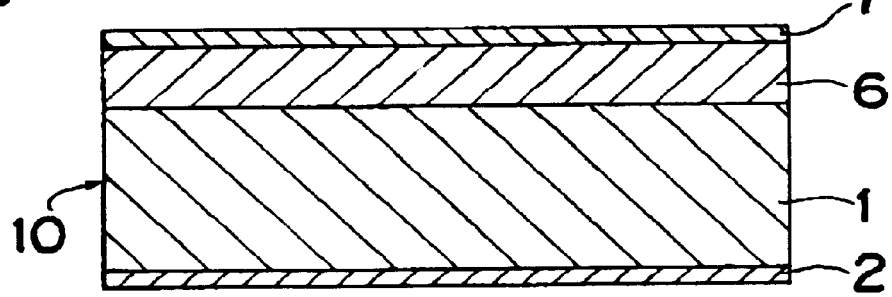

Then, dilute nitric acid of nearly 10% concentration is newly put into the anodic oxidation processing tank. Thus, using the anodic oxidation processing tank containing dilute nitric acid, the porous polycrystalline silicon layer 4 is oxidized by letting constant current flow between the platinum electrode and the n-type silicon substrate 1 in such a manner that the platinum electrode acts as a negative electrode and the silicon substrate 1 acts as a positive electrode. Thus, the structure shown in FIG. 7C is obtained. In FIG. 7C, the numeral 6 denotes a strong field drift layer formed by oxidizing the porous polycrystalline silicon layer 4, whose very surface layer has been oxidized by the oxidant solution, using acid (Although dilute nitric acid is used in Embodiment 4, dilute sulfuric acid of aqua regia may be used.).

After the strong field drift layer 6 has been formed, an electrically conductive thin film 7, which is composed of a thin gold film, is formed on the strong field drift layer 6. Thus, there is obtained such a field emission-type electron source 10 having the structure shown in FIG. 7D. Although the thickness of the electrically conductive thin film 7 is set to nearly 15 nm in Embodiment 4, the thickness need not be restricted to that.

Embodiment 5

Hereinafter, Embodiment 5 of the present invention will be described. However, because the fundamental construction and the manufacturing process of the field emission-type electron source according to Embodiment 5 are nearly as same as those of Embodiment 4 (further Embodiment 1), as to the constructive elements and the manufacturing step corresponding to those in Embodiment 4, detailed description about them will be simplified or omitted. Thus, differences to Embodiment 4 will be mainly described. Embodiment 5 will be described, referring to FIGS. 6A–6B, FIGS. 7A–7D, FIG. 8 and FIG. 9. In Embodiment 5, as the electrically conductive substrate, there is used a monocryatal n-type silicon substrate 1 whose electrical resistivity is comparatively near to that of an electrical conductor (for example, (100) type of substrate whose electrical resistivity is approximately 0.1 $\Omega$cm).

In the field emission-type electron source 10 shown in FIG. 6A according to Embodiment 5, also, as same as the case of Embodiment 4, electrons injected from the n-type silicon substrate 1 to the strong field drift layer 6 drift the layer 6, and then pass through the electrically conductive thin film 7 (surface electrode) to be emitted outward. The field emission-type electron source 10 is characterized in that the strong field drift layer 6 has a minute oxide film in which hydrogen content (entrance) is less in comparison with the conventional case. Hereupon, the oxide film is a very minute film having a $SiO_2$ structure or a structure nearer to the $SiO_2$ structure. In the field emission-type electron source 10, because the hydrogen content (entrance) in the strong field drift layer 6 is less, deterioration of the electron emitting efficiency due to time-depending change of the hydrogen distribution is less compared with the conventional case. Further, because the oxide film is very minute in comparison with the conventional case, the breakdown voltage for insulation of the source is higher.

Moreover, in Embodiment 5, although the strong field drift layer 6 is composed of the oxidized porous polycrystalline silicon layer, the layer 6 may be composed of an oxidized porous monocrystalline silicon.

Next, a manufacturing process of a field emission-type electron source according to Embodiment 5 will be described as an example, while referring to FIGS. 7A to 7D. However, because the manufacturing process is nearly as same as the manufacturing process described in Embodiment 4 (FIGS. 7A–7D), the members corresponding to members in Embodiment 4 are given the same numerals as same as those in Embodiment 4 so that detailed description about them will be simplified or omitted. Further, as to the steps as same as those in Embodiment 4, description about them will be simplified or omitted.

In the manufacturing process according to Embodiment 5, as same as the case of Embodiment 4, after an ohmic electrode 2 has been formed on the back surface of an n-type silicon substrate 1, a non-doped polycrystalline silicon layer 3 with a predetermined thickness (for example, 1.5 $\mu$m), which is one of semiconductor layers, is formed on the front surface of the n-type silicon layer 1 so that the structure shown in FIG. 7A is obtained. Hereupon, as same as the case of Embodiment 4 (Embodiment 1), when the electrically conductive substrate is a semiconductor substrate, the polycrystalline silicon layer 3 may be formed by means of the LPCVD process, the sputtering process or the like. Meanwhile, when the electrically conductive substrate is a substrate in which an electrically conductive film is formed on a glass plate, the polycrystalline silicon layer 3 may be formed by means of the process similar to those of Embodiment 4.

After the non-doped polycrystalline silicon layer 3 has been formed, as same as the case of Embodiment 4, a porous polycrystalline silicon layer 4 is formed by performing the anodic oxidation treatment so that the structure shown in FIG. 7B is obtained. Although the intensity of light applied to the polycrystalline silicon layer 3 and the current density are constant during the anodic oxidation process in the anodic oxidation treatment in Embodiment 5, those may be conveniently changed during the process (For example, the current density may be changed.).

After the anodic oxidation has been completed, the very surface layer of the porous polycrystalline silicon layer 4 is oxidized using an oxidant solution. Further, the layer 4 is oxidized by means of the RTO process so that a strong field drift layer 6 is formed. Thus, the structure shown in FIG. 7C is obtained. In short, in Embodiment 5, hydrogen atoms, which terminate silicon atoms in the porous polycrystalline silicon layer 4 formed by means of the anodic oxidation treatment, are substituted with oxygen atoms by the oxidation solution. Hereupon, as the oxidant solution, any one or a mixture of plural ones selected in a group of oxidants composed of nitric acid ($HNO_3$), sulfuric acid ($H_2SO_4$), hydrochloric acid (HCl) and hydrogen peroxide ($H_2O_2$) may be used.

After the strong field drift layer 6 has been formed, an electrically conductive thin film 7, which is composed of a thin gold film, is formed on the strong field drift layer 6, for example, by means of the vapor deposition process. Thus, there is obtained such a field emission-type electron source 10 having the structure shown in FIG. 7D. Hereupon, the thickness of the electrically conductive thin film 7 need not be restricted to a particular value, it may be any desirable value if only electrons, which has passed through the strong field drift layer 6, can pass through the film 7. Further, although the electrically conductive thin film 7 is formed by means of the vapor deposition process in Embodiment 5, the method of forming the electrically conductive thin film 7 need not be restricted to the vapor deposition process. For example, the sputter process may be used.

Thus, in the above-mentioned manufacturing method, the RTO process is performed to the very surface layer of the porous polycrystalline silicon layer 4 formed by means of the anodic oxidation treatment after the oxidation process using the oxidant solution, thereby the hydrogen content in the strong field drift layer 6 becomes smaller so that a minute oxide film having a $SiO_2$ structure or a structure nearer to the $SiO_2$ structure. In consequence, the field emission-type electron source, in which the time-dependent change of the electron emitting efficiency is less and further the breakdown voltage is higher, may be obtained.

Moreover, in the field emission-type electron source 10 manufactured according to the above-mentioned manufacturing method, as same as the field emission-type electron source 10 according to Embodiment 4, electrons can be stably emitted, because its electron emitting property has a smaller dependency to the degree of vacuum, and further a popping phenomenon is not caused when the electrons are emitted. Further, in addition to a semiconductor substrate such as a monocrystalline silicon substrate, there may be used a substrate in which an electrically conductive film (for example, ITO film) is provided on a surface of a glass plate or the like, as the electrically conductive substrate. Therefore, in the field emission-type electron source, its electron emitting area can be enlarged and its manufacturing cost can be lowered, in comparison with the Spindt-type electrode.

EXAMPLE 1

Hereinafter, as Example 1, there will be described a field emission-type electron source 10 manufactured under the following conditions, by means of the manufacturing method according to Embodiment 5.

In Example 1, as the n-type silicon substrate 1, there was used a (100) type silicon substrate, in which the electrical resistivity was 0.01–0.02 Ωcm and the thickness was 525 μm. The polycrystalline silicon layer 3 (see FIG. 7A) was formed by means of the LPCVD process. In the film forming process, the degree of vacuum was 20 Pa, the temperature of the substrate was 640° C., and the flow rate of the monosilane gas was 600 sccm.

In the anodic oxidation treatment, there was used an electrolyte in which hydrogen fluoride aqueous solution of 55 wt % and ethanol were mixed together in the ratio of nearly 1:1. In the anodic oxidation treatment, only one region of 10 mm diameter in the surface of the polycrystalline silicon layer 3 contacted with the electrolyte, while the other region of the surface was sealed so as not to contact with the electrolyte. Further, a platinum electrode was immersed in the electrolyte, and then a predetermined current was made flow between the platinum electrode and the n-type silicon substrate 1 (ohhmic electrode 2) in such a manner that the platinum electrode became a negative electrode and the substrate 1 became a positive electrode, while applying light with constant light power (intensity) to the polycrystalline silicon layer 3 using a tungsten lamp of 500 W. Hereupon, the current density was th constant value of 30 mA/cm$^2$, and the time of anodic oxidation process was 10 seconds.

As the oxidant solution, nitric acid (its concentration being 70%) heated up to 115° C. was used. By the way, if the oxidant solution is heated, the rate of oxidation is raised so that the process time of the oxidation using the oxidant solution can be shortened.

In the RTO process for oxidizing the porous polycrystalline silicon layer 4, the flow rate of the oxygen gas was 300 sccm, the oxidizing temperature was 900° C., and the oxidizing time was 1 hour. The electrically conductive thin film 7 (thin gold film 7) was formed by means of the vapor deposition process, the thickness of the firm being 15 nm.

Figure 8:
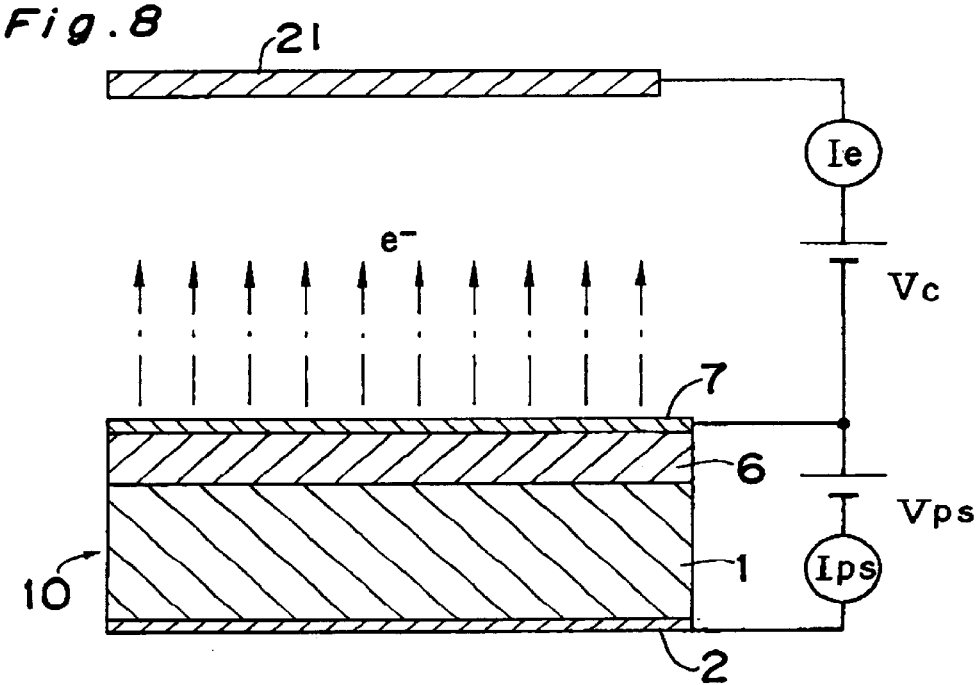
FIG. 8 is a view showing a principle for measuring active properties of the field emission-type electron source shown in FIG. 6A.

The field emission-type electron source 10 was introduced into a vacuum chamber (not shown), and then a collector electrode 21 (electrode for collecting emitted electrons) was disposed at a position facing to the electrically conductive thin film 7 as shown in FIG. 8. Then, the degree of vacuum in the vacuum chamber was set to 5×10$^{-5}$ Pa, DC voltage Vps was applied between the electrically conductive thin film 7 (anode) and the ohmic electrode 2 (cathode), and further DC voltage Vc of 100 V was applied between the collector electrode 21 and the electrically conductive thin film 7. Thus, there were measured diode current Ips flowing between the electrically conductive thin film 7 and the ohmic electrode 2, and emitted electron current Ie flowing between the collector electrode 21 and the electrically conductive thin film 7 due to electrons e$^-$emitted from the field emission-type electron source 10 through the electrically conductive thin film 7 (The dashed line in FIG. 8 shows the current of the emitted electrons.).

Figure 9:
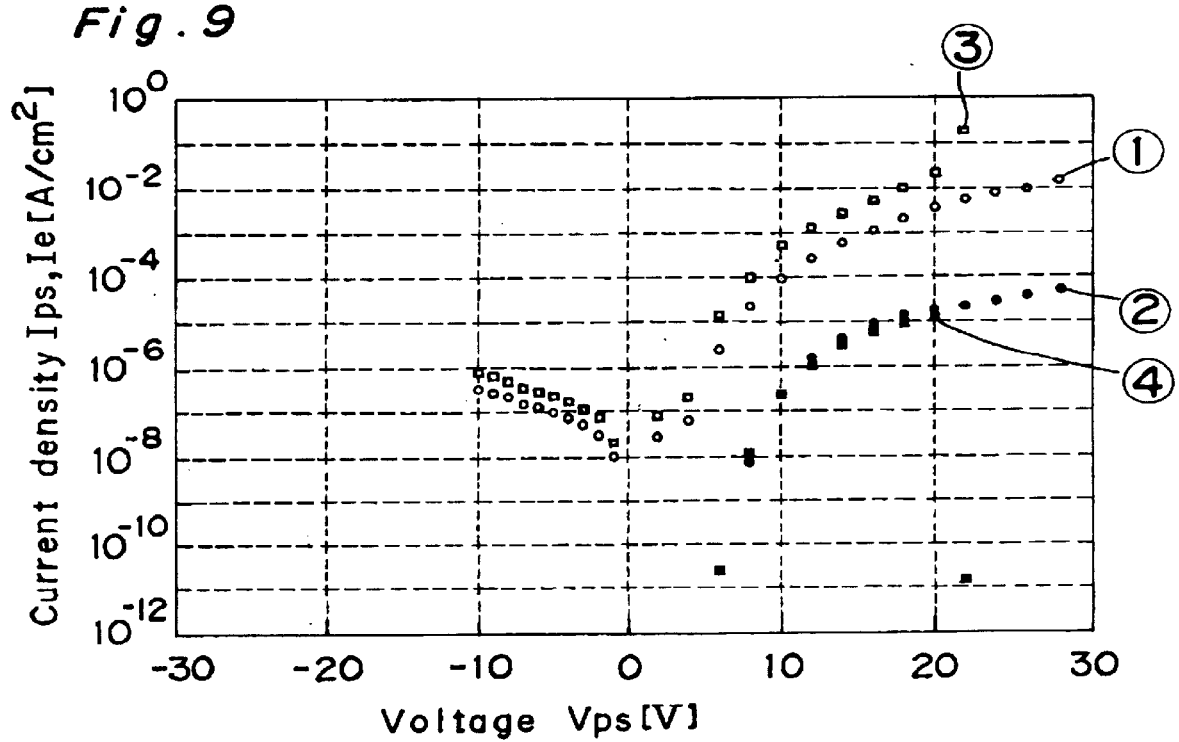
FIG. 9 is a graph showing relationships between voltage and current density (voltage-current property) in the field emission-type electron source of the present invention and the field emission-type electron source of a comparative example.

FIG. 9 shows the result of the measurement. In FIG. 9, the horizontal axis shows the DC voltage Vps, and the vertical axis shows the current density. Further, in FIG. 9, the marks ○ (①) and ● (②) show the diode current Ips and the emitted electron current Ie in Example 1, respectively.

Moreover, in FIG. 9, as an example for comparison, there is also shown the result obtained by performing a measurement similar to the above-mentioned measurement as to a field emission-type electron source, which was manufactured under the same conditions as those of Example 1 except omitting the oxidation using the oxidant solution before the RTO process. In FIG. 9, the marks □ (③) and ■ (④) show the diode current Ips and the emitted electron current Ie in the example for comparison, respectively.

As apparent from FIG. 9, when Example 1 is compared with the example for comparison, the diode current Ips of Example 1 is lower than that of the example for comparison, although the emitted electron currents Ie of the both are nearly same. Because the electron emitting efficiency is expressed by the ratio of the emitted electron current Ie to the diode current Ips, that is Ie/Ips, it may be understood that the electron emitting efficiency of the field emission-type electron source 10 according to Example 1 is higher than that of the example for comparison. Further, a dielectric breakdown occurs at a point that DC voltage Vps is 22 V in the example for comparison, while such a dielectric breakdown does not occur in Example 1 even if DC voltage Vps is raised up to 28 V. That is, the breakdown voltage of Example 1 is higher than that of the example for comparison.

EXAMPLE 2

Hereinafter, as Example 2, there will be described a field emission-type electron source 10 manufactured under the following condition.

In Example 2, as the n-type silicon substrate 1, there was used a (100) type silicon substrate, in which the electrical resistivity was 0.01–0.02 Ωcm and the thickness was 525 μm. The polycrystalline silicon layer 3 (see FIG. 7A) was formed by means of the LPCVD process. In the film forming process, the degree of vacuum was 20 Pa, the temperature of the substrate was 640° C., and the flow rate of the monosilane gas was 600 sccm.

In the anodic oxidation treatment, there was used an electrolyte in which hydrogen fluoride aqueous solution of 55 wt % and ethanol were mixed together in the ratio of nearly 1:1. In the anodic oxidation treatment, only one region of 10 mm diameter in the surface of the polycrystalline silicon layer 3 contacted with the electrolyte, while the other region of the surface was sealed so as not to contact with the electrolyte. Further, a platinum electrode was immersed in the electrolyte, and then a predetermined current was made flow between the platinum electrode and the n-type silicon substrate 1 (ohhmic electrode 2) in such a manner that the platinum electrode became a negative electrode and the substrate 1 became a positive electrode, while applying light with constant light power (intensity) to the polycrystalline silicon layer 3 using a tungsten lamp of 500 W. Hereupon, the current density was th constant value of 30 mA/cm$^2$, and the time of anodic oxidation process was 10 seconds.

After the porous polycrystalline silicon layer 4 has been formed, the layer 4 was electrochemically oxidized with the constant current of 1 mA/cm² in 1 molar wt % of sulfuric acid solution of 70° C. in such a manner that the platinum electrode became a negative electrode and the n-type silicon substrate 1 (electrically conductive substrate) became a positive electrode. Then the porous polycrystalline silicon layer 4 was washed using water and further dried up. Moreover, on the oxidized porous polycrystalline silicon layer 4, there was formed an electrically conductive thin film 7 (surface electrode) composed of gold (Au) having a thickness of 10 nm.

Figure 14:
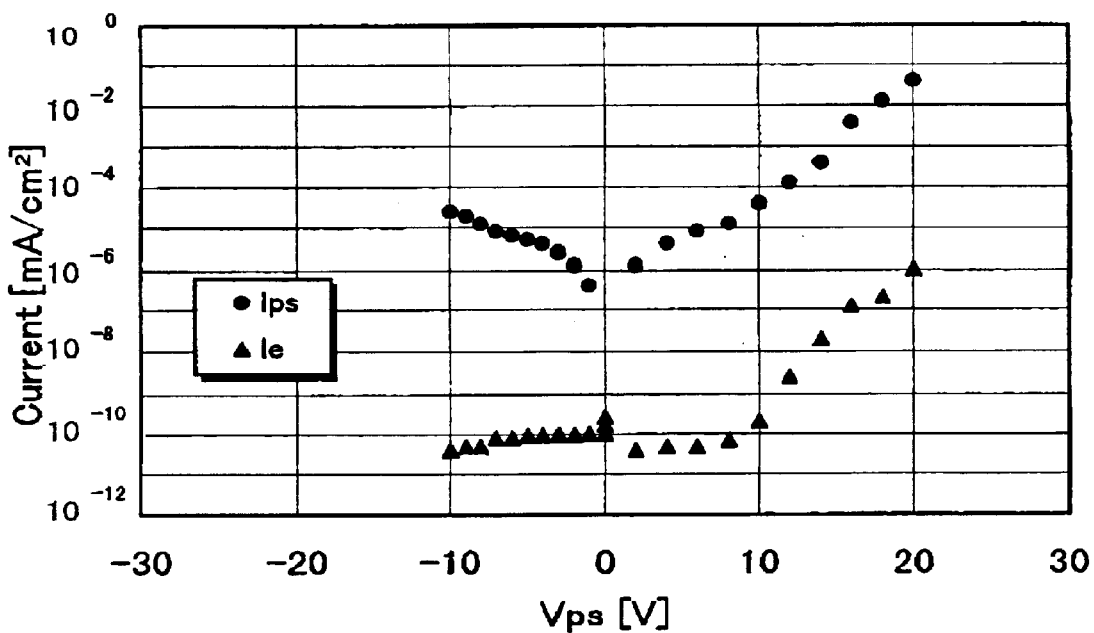
FIG. 14 is a graph showing an operating characteristic of a field emission-type electron source according to Example 2.

Thus, the electron emitting efficiency of the field emission-type electron source 10 obtained as described above was measured in such a manner that the electrically conductive thin film 7 became a positive electrode and the n-type silicon substrate 1 (ohmic electrode 2) became a negative electrode. According to the measurement, when the voltage Vps was 20 V, the emitted electron current was 1 μm/cm². The result is shown in FIG. 14.

Thus, although the only oxidation treatment of lower temperature was performed, there is observed emission of electrons of the emitted electron current. Therefore, if there is used a substrate such as a glass plate, which requires to be treated at lower temperature process, any desired field emission-type electron source may be manufactured.

Hereupon, the processing condition such as kind of the acid, current density or the like need not be restricted to the above-mentioned condition.

EXAMPLE 3

Hereinafter, as Example 3, there will be described a field emission-type electron source 10 manufactured under the following conditions.

In Example 3, as the n-type silicon substrate 1, there was used a (100) type silicon substrate, in which the electrical resistivity was 0.01–0.02 Ωcm and the thickness was 525 μm. The polycrystalline silicon layer 3 (see FIG. 7A) was formed by means of the LPCVD process. In the film forming process, the degree of vacuum was 20 Pa, the temperature of the substrate was 640° C., and the flow rate of the monosilane gas was 600 sccm.

In the anodic oxidation treatment, there was used an electrolyte in which hydrogen fluoride aqueous solution of 55 wt % and ethanol were mixed together in the ratio of nearly 1:1. In the anodic oxidation treatment, only one region of 10 mm diameter in the surface of the polycrystalline silicon layer 3 contacted with the electrolyte, while the other region of the surface was sealed so as not to contact with the electrolyte. Further, a platinum electrode was immersed in the electrolyte, and then a predetermined current was made flow between the platinum electrode and the n-type silicon substrate 1 (ohhmic electrode 2) in such a manner that the platinum electrode became a negative electrode and the substrate 1 became a positive electrode, while applying light with constant light power (intensity) to the polycrystalline silicon layer 3 using a tungsten lamp of 500 W. Hereupon, the current density was th constant value of 30 mA/cm², and the time of anodic oxidation process was 10 seconds.

After the porous polycrystalline silicon layer 4 had been formed, the layer 4 was electrochemically oxidized with the constant current of 20 mA/cm² in 1 molar wt % of sulfuric acid solution of 25° C. in such a manner that the platinum electrode became a negative electrode and the n-type silicon substrate 1 (electrically conductive substrate) became a positive electrode. Then the porous polycrystalline silicon layer 4 was washed using water and further dried up.

Further, a supplemental oxidation treatment by means of the rapid thermal oxidation process was performed to the layer 4. In the rapid thermal oxidation process, the flow rate of oxygen gas was 300 sccm, the oxidizing temperature was 750° C., and the oxidizing time was 1 hour.

Then, on the oxidized porous polycrystalline silicon layer 4, there was formed an electrically conductive thin film 7 (surface electrode) composed of gold (Au) having a thickness of 10 nm.

Figure 15:
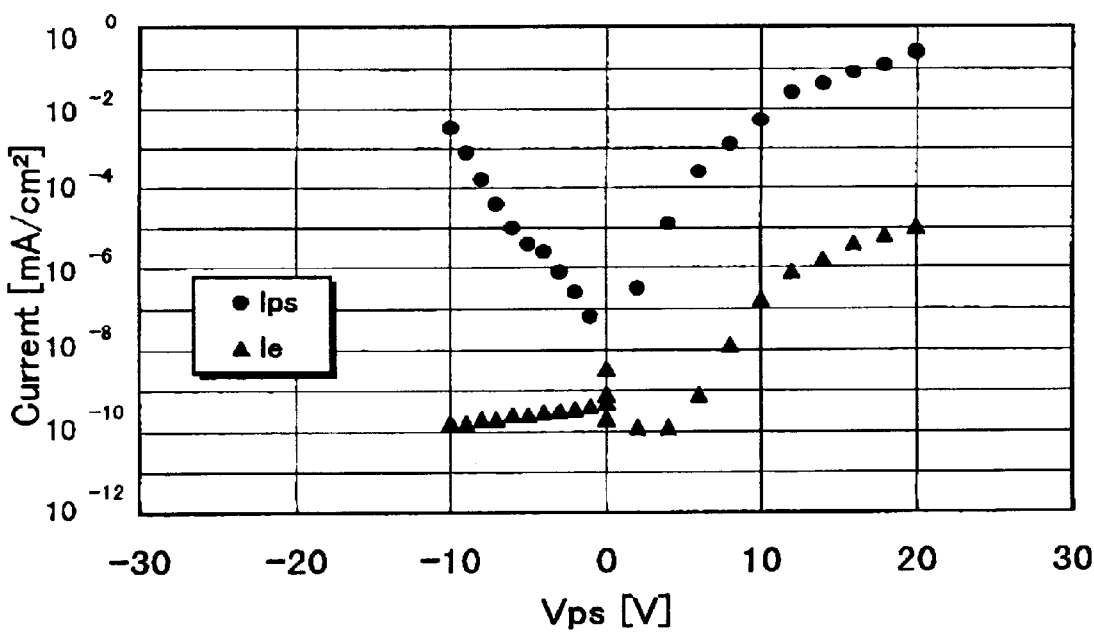
FIG. 15 is a graph showing an operating characteristic of a field emission-type electron source according to Example 3.

Thus, the electron emitting efficiency of the field emission-type electron source 10 obtained as described above was measured in such a manner that the electrically conductive thin film 7 became a positive electrode and the n-type silicon substrate 1 (ohmic electrode 2) became a negative electrode. According to the measurement, when the voltage Vps was 20 V, the emitted electron current was 10 μm/cm². The result is shown in FIG. 15.

Thus, although there was performed the only oxidation treatment of comparatively lower temperature in comparison with the process using the only rapid thermal oxidation process, there is observed much emission of electrons of the emitted electron current. Therefore, if there is used a substrate, which requires to be treated at lower temperature process, any desired field emission-type electron source may be manufactured.

Hereupon, the processing condition such as kind of the acid, temperature of the acid, current density, the type of the rapid thermal oxidation or the like need not be restricted to the above-mentioned condition.

Embodiment 6

Hereinafter, Embodiment 6 of the present invention will be described. However, because the fundamental construction and the manufacturing process of the field emission-type electron source according to Embodiment 6 are nearly as same as those of Embodiment 5, as to the constructive elements and the manufacturing step corresponding to those in Embodiment 5, detailed description about them will be simplified or omitted. Thus, differences to Embodiment 5 will be mainly described. Embodiment 6 will be described, referring to FIGS. 6A–6B, FIGS. 7A–7D, FIG. 8 and FIGS. 10A–10B.

As describe above, in the field emission-type electron source 10 shown in FIG. 4, the strong field drift layer 6 includes at least the pillar-shaped polycrystalline silicon grains 61, the thin silicon oxide films 62 formed on the surfaces of the polycrystalline silicon grains 61, the fine crystalline silicon layers 63 of nano meter order existing among the polycrystalline silicon grains 61, and the silicon oxide films 64 formed on the surfaces of the fine crystalline silicon layers 63, each of the films 64 being an insulating film having a thickness smaller than the diameter of a crystal particle of the fine crystalline silicon layer 63.

In the strong field drift layer 6 of the field emission-type electron source 10 described above, it may be considered that the surface of each of the grains is made porous, while the crystal state is maintained in the central portion of each of the grains. Therefore, the electrical field, which is applied to the strong field drift layer 6, is mostly applied to the silicon oxide films 64. Thus, electrons injected to the layer 6 are accelerated by the strong electrical field applied to the silicon oxide films 64 so that the electrons drift among the polycrystalline silicon grains 61 in the direction of the arrow A in FIG. 4 toward the surface of the layer 6. Accordingly, the electron emitting efficiency of the source is improved.

Figure 10A:
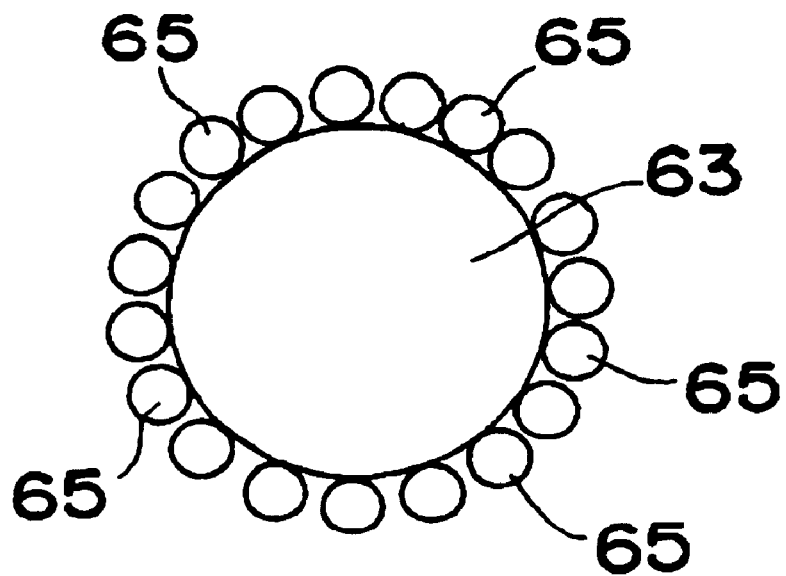
FIGS. 10A and 10B are views showing oxidized states of a nano crystalline silicon layer.
Figure 10B:
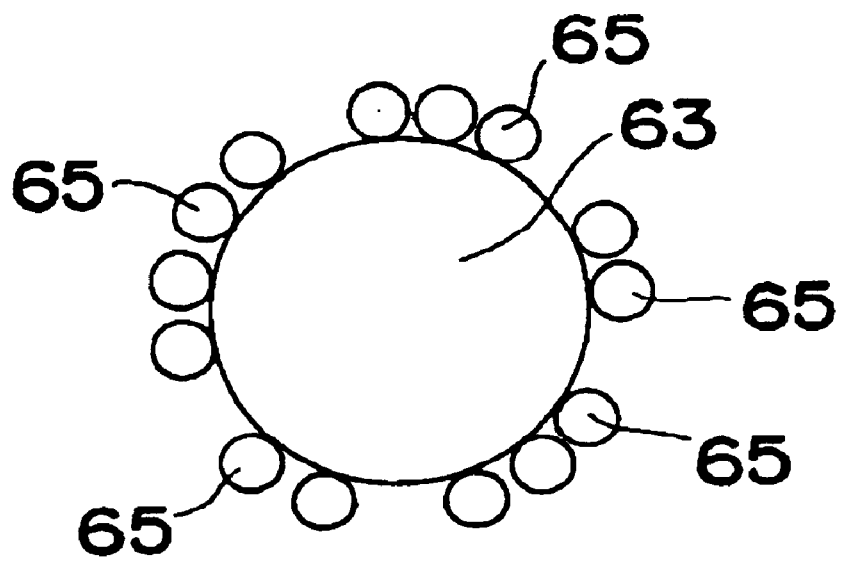

Thus, the inventors of the present application have performed the following inventions according to Embodiments 6 to 14 in view of the silicon oxide films 64. That is, the inventors of the present application considers that the whole surfaces of the fine crystalline silicon layers 63 would be covered by oxygen atoms 65 as shown in FIG. 10A when the surfaces of the fine crystalline silicon layers 63 have been completely oxidized, while the surfaces of the fine crystal silicon layers 63 would not be wholly covered by the oxygen atoms 65 as shown in FIG. 10B when the oxidation has been performed by the RTO process (namely, the fine crystal silicon layers 63 would be insufficiently covered by the oxygen atoms 65). Thus, the inventors have performed the inventions according to Embodiments 6 to 14 on the basis of the above-mentioned consideration. In Embodiment 6, as the electrically conductive substrate, there is used a monocrystalline n-type silicon substrate 1 whose electrical resistivity is comparatively near to that of an electrical conductor (for example, (100) type of silicon substrate whose electrical resistivity is approximately 0.1 Ωcm).

In the field emission-type electron source 10 shown in FIG. 6A according to Embodiment 6, also, electrons injected from the n-type silicon substrate 1, which is an electrically conductive substrate, drift the strong field drift layer 6, and then are emitted outward through the electrically conductive thin film 7, by a process as same as that of Embodiment 5. Hereupon, materials for the electrically conductive thin film 7 need not be restricted to gold. Any material (for example, aluminum, chrome, tungsten, nickel, platinum or the like) may be used if only its work function is small.

Further, although the electrically conductive thin film 7 is formed as a single layer in Embodiment 6, it may be formed as a laminated thin electrode film composed of at least two layers laminated in the direction of the thickness of the layers. When the electrically conductive thin film 7 is composed of a laminated thin electrode film having two layers, for example, gold or the like may be used as the material for the upper layer of the laminated thin electrode film. On the other hand, as the material of the lower layer of the laminated thin electrode film (the thin layer facing the strong field drift layer 6), there may be used, for example, chrome, nickel, platinum, titanium, iridium or the like.

Next, a manufacturing process of a field emission-type electron source according to Embodiment 6 will be described as an example, while referring to FIGS. 7A to 7D. However, because the manufacturing process is nearly as same as the manufacturing process described in Embodiment 4 or 5 (FIGS. 7A–7D), the members corresponding to members in Embodiment 4 or 5 are given the same numerals as same as those in Embodiment 4 or 5 so that detailed description about them will be simplified or omitted. Further, as to the steps as same as those in Embodiment 4 or 5, description about them will be simplified or omitted.

In the manufacturing process according to Embodiment 6, as same as the case of Embodiment 4 or 5, after an ohmic electrode 2 has been formed on the back surface of an n-type silicon substrate 1, a non-doped polycrystalline silicon layer 3 with a predetermined thickness (for example, 1.5 μm), which is one of semiconductor layers, is formed on the front surface of the n-type silicon layer 1 so that the structure shown in FIG. 7A is obtained. Hereupon, the polycrystalline silicon layer 3 is formed by means of a process similar to that of Embodiment 4 or 5.

After the non-doped polycrystalline silicon layer 3 has been formed, as same as the case of Embodiment 4 or 5, a porous polycrystalline silicon layer 4 is formed by performing the anodic oxidation treatment so that the structure shown in FIG. 7B is obtained. In the anodic oxidation treatment in Embodiment 6, the current density is constant. Further, during the anodic oxidation process, light is applied to the surface of the polycrystalline silicon layer 3 using a tungsten lamp of 500 W so that the polycrystalline silicon layer 3 is wholly made porous. However, only a portion of the polycrystalline silicon layer 3 may be made porous.

Next, a strong field drift layer 6 is formed by oxidizing the porous polycrystalline silicon layer 4 so that the construction shown in FIG. 7C is obtained. Hereupon, during the step of oxidizing the porous polycrystalline silicon layer 4, the porous polycrystalline silicon substrate 4 is oxidized by applying ultraviolet rays thereto in a gas atmosphere containing at least one of oxygen ($O_2$) and ozone ($O_3$). Hereupon, as the light source of the ultraviolet rays, there may be used, for example, an ultraviolet lamp (for example, a low-pressure mercury lamp whose main wave length component is 185 nm or 256 nm) or an excimer laser whose main wave length component is 172 nm. Time for applying the ultraviolet rays may be conveniently set to a value in a range of a few minutes to a few hours.

After the strong field drift layer 6 has been formed, an electrically conductive thin film 7 is formed on the strong field drift layer 6, for example, by means of the vapor deposition process. Thus, there is obtained such a field emission-type electron source 10 having the structure shown in FIG. 7D. Hereupon, although the electrically conductive thin film 7 is formed by means of the vapor deposition process in Embodiment 6, the method of forming the electrically conductive thin film 7 need not be restricted to the vapor deposition process. For example, the sputter process may be used.

By the way, in the manufacturing method disclosed in the Japanese Patent Application of No. 10-272340 or No. 10-272342, the strong field drift layer 6 is formed by oxidizing the porous polycrystalline silicon layer 4 by means of the RTO process. In this case, because the temperature of oxidation is comparatively higher (800–900° C.), it may be obliged to use a substrate in which an electrically conductive film is provided on an expensive quartz glass, or a monocrystalline silicon substrate, as the electrically conductive substrate. Accordingly, because it is restricted to enlarge the area of the electrically conductive substrate, there may occur, for example, such a disadvantage that it is difficult to achieve a display having a larger area.

On the contrary, in the manufacturing method of the field emission-type electron source according to Embodiment 6, because the porous polycrystalline silicon layer 4 is oxidized in the gas atmosphere containing at least one of oxygen and ozone while applying ultraviolet rays thereto during the oxidation step of the silicon layer 4, the electron emitting efficiency (efficiency of emitting electrons) is raised in comparison with the method of forming the strong field drift layer by oxidizing the porous polycrystalline silicon layer 4 by means of the RTO process. Hereupon, the electron emitting efficiency is the value obtained by the formula of (Ie/Ips)×100 on the basis of the diode current Ips and the emitted electron current Ie. It may be considered that the reason why the electron emitting efficiency is high as described above, is such a matter that when the ultraviolet rays are applied in the ozone atmosphere, for example, silicon bonds in the uppermost surface of the fine crystal silicon layer 63 shown in FIG. 10B are cut by the ultraviolet rays and Si-O bonds are produced by active ozone so that the ratio of the surface of the fine crystal silicon layer 63, which is covered by the oxygen atoms 65 (That is, it approaches an ideal state shown in FIG. 10A.) is improved. Hereupon, it is of course that decomposition of the gas is promoted by applying the ultraviolet rays.

Thus, according to the manufacturing method of Embodiment 6, because the porous polycrystalline silicon layer 4 is oxidized in the gas atmosphere containing at least one of oxygen and ozone while applying ultraviolet rays thereto during the oxidation step of the silicon layer 4, the electron emitting efficiency is raised. Further, because the strong field drift layer 6 is formed by oxidizing the porous polycrystalline silicon layer 4 without heating the layer 4, the strong field drift layer may be formed at a lower temperature in comparison with the case of forming the strong field drift layer by oxidizing the porous polycrystalline silicon layer by means of the RTO process (in this case, it must be heated up to 800 to 900° C.). Therefore, because the process temperature is lower, restriction for materials of the electrically conductive substrate becomes less so that enlarging area and lowering manufacturing cost of the electron source may be easily achieved.

Embodiment 7

Hereinafter, Embodiment 7 of the present invention will be described. However, because the fundamental construction and the manufacturing process of the field emission-type electron source according to Embodiment 7 are nearly as same as those of Embodiment 6 except that its oxidation step of the porous polycrystalline silicon layer 4 is different from that of Embodiment 6. Therefore, as to the constructive elements and the manufacturing step corresponding to those in Embodiment 6, detailed description about them will be simplified or omitted. Thus, differences to Embodiment 6 will be mainly described.

In Embodiment 7, in the oxidation step of oxidizing the porous polycrystalline silicon layer 4, the porous polycrystalline silicon layer 4 is oxidized by exposing the layer 4 to plasma in a gas atmosphere containing at least one of oxygen and ozone (main oxidation step). Hereupon, the plasma may be produced, for example, using a high frequency of 13.56 MHz. When high frequency of 13.56 MHz is used, RF power may be set to, for example, several tens of W to several hundreds of W. Further, time for exposing the porous polycrystalline silicon layer 4 to plasma may be conveniently set to a value in the range of several minutes to several hours. Hereupon, plasma may be produced by causing electric discharge in the above-mentioned gas atmosphere. Meanwhile, plasma may be produced in another gas atmosphere (for example, inert gas).

Thus, according to the manufacturing method of Embodiment 7, as same as the case of Embodiment 6, the electron emitting efficiency may be raised in comparison with the conventional case of forming the strong field drift layer by means of the RTO process. Further, as same as the case of Embodiment 6, the area of the field emission-type electron source 10 may be easily enlarged and further the manufacturing cost of the source may be easily lowered.

Embodiment 8

Hereinafter, Embodiment 8 of the present invention will be described. However, because the fundamental construction and the manufacturing process of the field emission-type electron source according to Embodiment 8 are nearly as same as those of Embodiment 6 except that its oxidation step of the porous polycrystalline silicon layer 4 is different from that of Embodiment 6. Therefore, as to the constructive elements and the manufacturing step corresponding to those in Embodiment 6, detailed description about them will be simplified or omitted. Thus, differences to Embodiment 6 will be mainly described.

In Embodiment 8, in the oxidation step of oxidizing the porous polycrystalline silicon layer 4, the porous polycrystalline silicon layer 4 is oxidized by heating the layer 4 in a gas atmosphere containing at least ozone (main oxidation step). Hereupon, the temperature and time of the heating process may be conveniently set to a value in the range of 100 to 600° C. and a value in the range of several minutes to several hours, respectively. Hereupon, the temperature of the heating process may be higher than 600° C. However, it is preferable to set the temperature to a convenient value in the range of 100 to 600° C. in view of lowering restriction for materials of the electrically conductive substrate (for example, in order to use a substrate in which an electrically conductive film is provided on an glass plate whose price is more inexpensive than that of a quartz glass plate, as the electrically conductive substrate).

Thus, according to the manufacturing method of Embodiment 8, as same as the case of Embodiment 6, the electron emitting efficiency may be raised in comparison with the conventional case of forming the strong field drift layer by means of the RTO process. Further, as same as the case of Embodiment 6, the area of the field emission-type electron source 10 may be easily enlarged and further the manufacturing cost of the source may be easily lowered.

Embodiment 9

Hereinafter, Embodiment 9 of the present invention will be described. However, because the fundamental construction and the manufacturing process of the field emission-type electron source according to Embodiment 9 are nearly as same as those of Embodiment 6 except that its oxidation step of the porous polycrystalline silicon layer 4 is different from that of Embodiment 6. Therefore, as to the constructive elements and the manufacturing step corresponding to those in Embodiment 6, detailed description about them will be simplified or omitted. Thus, differences to Embodiment 6 will be mainly described.

In Embodiment 9, in the oxidation step of oxidizing the porous polycrystalline silicon layer 4, the porous polycrystalline silicon layer 4 is oxidized by applying ultraviolet rays to the layer 4 and heating the layer 4 (main oxidation step). Hereupon, the temperature and time of the heating process may be conveniently set to a value in the range of 100 to 600° C. and a value in the range of several minutes to several hours, respectively. Hereupon, although the temperature of the heating process may be higher than 600° C., it is preferable to set the temperature to a convenient value in the range of 100 to 600° C. due to the same reason as that of Embodiment 8.

Thus, according to the manufacturing method of Embodiment 9, as same as the case of Embodiment 6, the electron emitting efficiency may be raised in comparison with the conventional case of forming the strong field drift layer by means of the RTO process. Further, as same as the case of Embodiment 6, the area of the field emission-type electron source 10 may be easily enlarged and further the manufacturing cost of the source may be easily lowered.

Embodiment 10

Hereinafter, Embodiment 10 of the present invention will be described. However, because the fundamental construction and the manufacturing process of the field emission-type electron source according to Embodiment 10 are nearly as same as those of Embodiment 6 except that its oxidation step of the porous polycrystalline silicon layer 4 is different from that of Embodiment 6. Therefore, as to the constructive elements and the manufacturing step corresponding to those in Embodiment 6, detailed description about them will be simplified or omitted. Thus, differences to Embodiment 6 will be mainly described.

In Embodiment 10, in the oxidation step of oxidizing the porous polycrystalline silicon layer 4, the porous polycrystalline silicon layer 4 is oxidized by applying ultraviolet rays to the layer 4 in a gas atmosphere containing at least one of oxygen and ozone and heating the layer 4 (main oxidation step). Hereupon, the temperature and time of the heating process may be conveniently set to a value in the range of 100 to 600° C. and a value in the range of several minutes to several hours, respectively. Hereupon, although the temperature of the heating process may be higher than 600° C., it is preferable to set the temperature to a convenient value in the range of 100 to 600° C. due to the same reason as that of Embodiment 8.

Thus, according to the manufacturing method of Embodiment 10, as same as the case of Embodiment 6, the electron emitting efficiency may be raised in comparison with the conventional case of forming the strong field drift layer by means of the RTO process. Further, as same as the case of Embodiment 6, the area of the field emission-type electron source 10 may be easily enlarged and further the manufacturing cost of the source may be easily lowered.

Embodiment 11

Hereinafter, Embodiment 11 of the present invention will be described. The fundamental construction and the manufacturing process of the field emission-type electron source according to Embodiment 11 are nearly as same as those of any one of Embodiments 6 to 10. However, the manufacturing method is characterized in that it includes a supplemental oxidation step of oxidizing the porous polycrystalline silicon layer 4 by means of the rapid heating process performed before and/or after the main oxidation step in any one of Embodiments 6 to 10. Hereupon, the supplemental oxidation step by the rapid heating process, in which for example a lamp annealing apparatus is used, is performed in a dry oxygen atmosphere by setting the temperature and time of the oxidation process to 600–900° C. and 30–120 minutes, respectively. Thus, according to the manufacturing method of Embodiment 11, the electron emitting efficiency may be much more raised, because insufficient oxidation in the oxidation process, which is caused in the conventional oxidation process, is supplemented.

Embodiment 12

Hereinafter, Embodiment 12 of the present invention will be described. The fundamental construction and the manufacturing process of the field emission-type electron source according to Embodiment 12 are nearly as same as those of any one of Embodiments 6 to 11. However, the manufacturing method is characterized in that it includes another supplemental oxidation step of oxidizing the porous polycrystalline silicon layer 4 using acid performed before and/or after the main oxidation step (or the supplemental oxidation step in Embodiment 11) in any one of Embodiments 6 to 11. That is, in the manufacturing process according to Embodiment 12, the strong field drift layer 6 is formed, for example, by performing any one of the following treatments (1)–(10) to the porous polycrystalline silicon layer 4. In the following treatments, [A] denotes the supplemental oxidation step using acid, [M] denotes the main oxidation step, and [H] denotes the supplemental oxidation step by means of the rapid heating process.

(1) [A] →[M]
(2) [M] →[A]
(3) [H] →[M]
(4) [M] →[H]
(5) [A] →[M] →[H]
(6) [H] →[M] →[A]
(7) [A] →[H] →[M]
(8) [H] →[A] →[M]
(9) [M] →[A] →[H]
(10) [M] →[H] →[A]

Hereupon, the supplemental oxidation step using acid may be performed using a processing tank (the processing tank for the anodic oxidation treatment in Embodiment 6 may be used for this purpose) containing acid (for example, $HNO_3$, $H_2SO_4$, aqua regia or the like) by letting flow a predetermined current between the platinum electrode (not shown) and the n-type silicon substrate 1 (ohmic electrode 2) in such a manner the platinum electrode acts as the negative electrode and the substrate 1 acts as the positive electrode.

Hereupon, it may be considered that when the porous polycrystalline silicon layer 4 is oxidized using, for example, dilute nitric acid (for example, dilute nitric acid of 10%) before the main oxidation step, there occur such reactions as shown by the reaction formulas 1 and 2 described above (Embodiment 1). Meanwhile, it may be considered that when the porous polycrystalline silicon layer 4 is oxidized using dilute sulfuric acid (for example, dilute sulfuric acid of 10%) before the main oxidation step, there occur such reactions as shown by the reaction formulas 3 and 4 described above (Embodiment 2).

Thus, according to the manufacturing method of Embodiment 12, insufficient oxidation in the oxidation process, which is caused in the conventional oxidation process, is supplemented so that the electron emitting efficiency may be much more raised.

Embodiment 13

Hereinafter, Embodiment 13 of the present invention will be described. The fundamental construction and the manufacturing process of the field emission-type electron source according to Embodiment 13 are nearly as same as those of any one of Embodiments 6 to 10. However, the manufacturing method is characterized in that it includes a pre oxidation step of oxidizing the porous polycrystalline silicon layer 4 using a oxidant solution before the main oxidation step in any one of Embodiments 6 to 10. That is, the strong field drift layer 6 is formed by performing the main oxidation step after the very surface layer of the porous polycrystalline silicon layer 4 has been oxidized.

In the manufacturing method according to each of Embodiments 6 to 10, because the mixture solution, in which hydrogen fluoride aqueous solution and ethanol are mixed together, is used as the electrolyte in the anodic oxidation treatment, silicon atoms are terminated by hydrogen atoms. Accordingly, the hydrogen content in the strong field drift layer 6 becomes comparatively higher so that the breakdown voltage is lowered or the distribution of the hydrogen atoms changes with the lapse of time. In consequence, it is feared that the stability of the electron emitting efficiency with time passing may deteriorated.

On the contrary, in the manufacturing method according to Embodiment 13, the hydrogen atoms terminating the silicon atoms in the porous polycrystalline silicon layer 4, which has been formed by the anodic oxidation treatment, are substituted with oxygen atoms by the oxidant solution. Hereupon, as the oxidant solution, there may be used any one or a mixture of plural ones selected in a group of oxidants composed of nitric acid, sulfuric acid, hydrochloric acid and hydrogen peroxide aqueous solution.

Thus, in the manufacturing method according to Embodiment 13, the main oxidation step is performed after the very surface layer of the porous polycrystalline silicon layer 4 formed by the anodic oxidation treatment has been oxidized using the oxidant solution, in consequence the hydrogen content in the strong field drift layer 6 can be lowered. Therefore, in the obtained field emission-type electron source, time-dependent change of the electron emitting efficiency may be smaller and the breakdown voltage may be higher.

Meanwhile, in the manufacturing method according to each of Embodiments 11 and 12, a pre oxidation step of oxidizing the porous polycrystalline silicon layer 4 using an oxidant solution may be performed before the main oxidation step and the supplemental oxidation step(s).

In the oxidation step using the oxidant solution, if the oxidant solution is heated, the rate of oxidation becomes larger so that the processing time may be shortened.

EXAMPLE 4

Hereinafter, as Example 4, there will be described a field emission-type electron source 10 manufactured under the following conditions, by means of the manufacturing method according to Embodiment 13.

In Example 4, as the n-type silicon substrate 1, there was used a (100) type silicon substrate, in which the electrical resistivity was 0.1 Ωcm and the thickness was 525 $\mu$m. The polycrystalline silicon layer 3 (see FIG. 7A) was formed by means of the LPCVD process. In the film forming process, the degree of vacuum was 20 Pa, the temperature of the substrate was 640° C., and the flow rate of the monosilane gas was 600 sccm.

In the anodic oxidation treatment, there was used an electrolyte in which hydrogen fluoride aqueous solution of 55 wt % and ethanol were mixed together in the ratio of nearly 1:1. In the anodic oxidation treatment, the surface of the polycrystalline silicon layer 3 was made contact with the electrolyte. Further, a predetermined current was let flow between the platinum electrode immersed in the electrolyte and the n-type silicon substrate 1 (ohhmic electrode 2) in such a manner that the platinum electrode became a negative electrode and the substrate 1 became a positive electrode. Hereupon, the current density was the constant value of 30 mA/cm$^2$, and the time of the anodic oxidation process was 10 seconds.

In the pre oxidation step, as the oxidant solution, there was used a mixture solution in which sulfuric acid and hydrogen peroxide aqueous solution are mixed together. Then, a sample, in which a porous polycrystalline silicon layer 4 was formed, was immersed in the oxidant solution for 30 minutes.

After the pre oxidation step, a supplemental oxidation step was performed. In the supplemental oxidation step, the sample was electrochemically oxidized in a sulfuric acid solution of 1 molar weight percent, by letting flow a constant current of 20 mA/cm$^2$ between the platinum electrode and the n-type silicon substrate 1 (ohmic electrode 2) in such a manner that the platinum electrode became the negative electrode and the substrate 1 became the positive electrode. Further, the sample was washed using water, and then dried up. Then, the main oxidation step was performed. In the main oxidation step, ultraviolet rays, whose main wavelengths are 185 nm and 254 nm, were applied to the main surface of the sample (substrate) in a gas atmosphere containing oxygen and ozone while heating the sample up to 500° C. Time of the main oxidation process was 1 hour.

The electrically conductive thin film 7 was formed by patterning a thin gold film using a photo lithography technique, an etching technique or the like, the gold film being deposited on the whole surface of the strong field drift layer 6 by means of the vapor deposition process. Hereupon, the thickness of the electrically conductive thin film 7 was 10 nm.

The field emission-type electron source 10, which had been manufactured as described above, was introduced into a vacuum chamber (not shown), and then a collector electrode 21 (electrode for collecting emitted electrons) was disposed at a position facing the electrically conductive thin film 7 as shown in FIG. 8. Then, the degree of vacuum in the vacuum chamber was set to 5×10$^{-5}$ Pa, and then DC voltage Vc of 100 V was applied between the collector electrode 21 and the electrically conductive thin film 7. Further, there were measured diode current Ips flowing between the electrically conductive thin film 7 and the ohmic electrode 2, and emitted electron current Ie flowing the collector electrode 21 and the electrically conductive thin film 7 due to electrons e emitted outward from the field emission-type electron source 10 through the electrically conductive thin film 7, while variously changing DC voltage Vps applied between the electrically conductive thin film 7 (anode) and the ohmic electrode 2 (cathode). In consequence, there was obtained such a good result that the emitted electron current Ie was 10 $\mu$A/cm$^2$.

Embodiment 14

Figure 11:
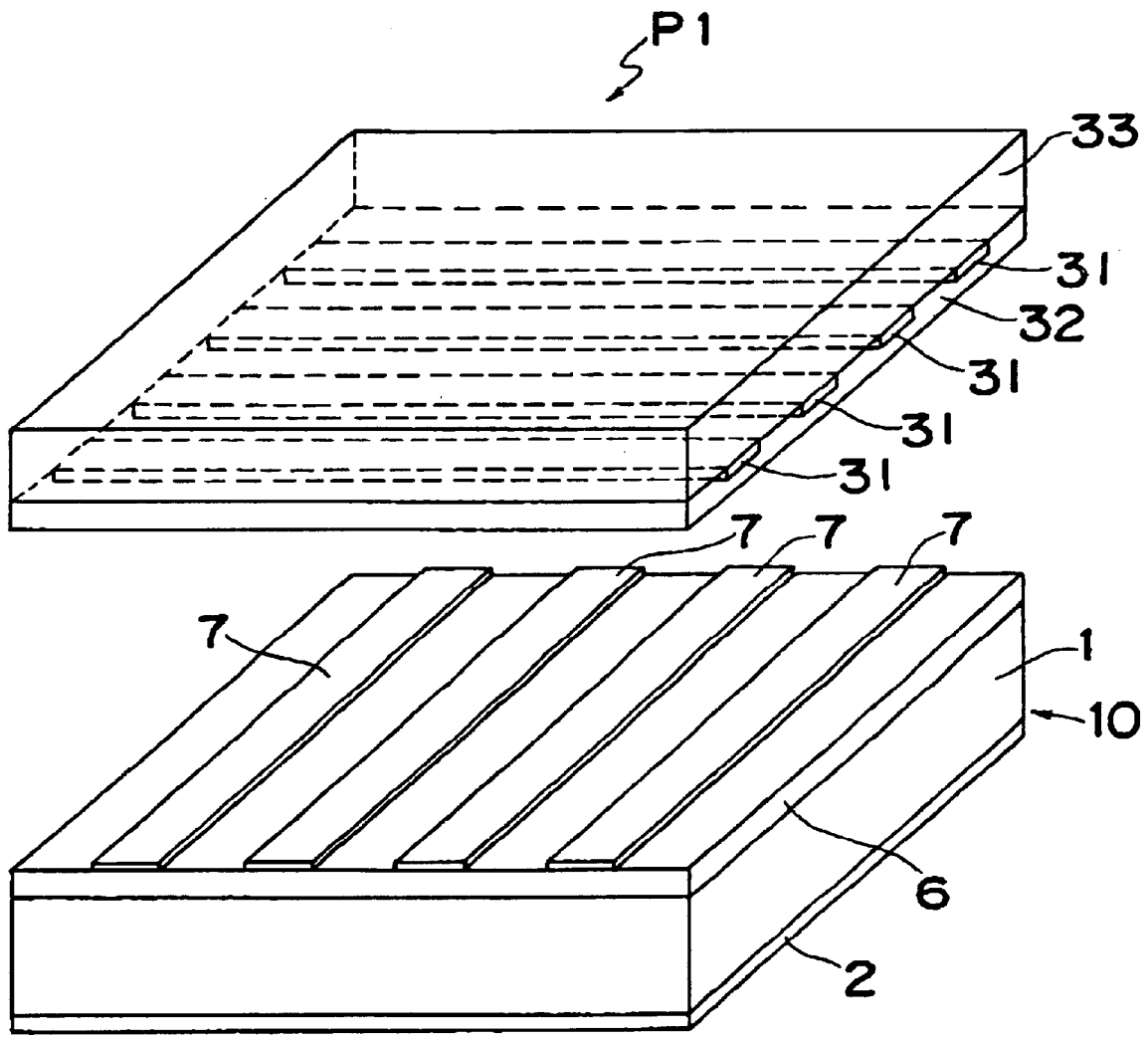
FIG. 11 is a rough perspective view of a display which utilizes a field emission-type electron source using an n-type silicon substrate, according to the present invention.

Hereinafter, Embodiment 14 of the present invention will be described. FIG. 11 shows an example of a display using a field emission-type electron source 10 having a construction nearly as same as that of Embodiment 6. However, in the field emission-type electron source 10 of Embodiment 14, which is a little different from the field emission-type electron source 10 of Embodiment 6, each of the electrically conductive thin films 7 is formed in a striped shape.

As shown in FIG. 11, the display P1 is provided with a glass substrate 33 which is disposed so as to face the electrically conductive thin films 7 of the field emission-type electron source 10. Thus, on the surface of the glass substrate 33, which faces the field emission-type electron source 10, collector electrodes 31 of striped shape are formed. Further, the display P1 is provided with a fluorescent layer 32 which emits visible light due to the electron beams emitted from the electrically conductive thin films 7, the layer 32 being formed so as to cover the collector electrodes 31. Hereupon, a space formed between the field emission-type electron source 10 and the glass substrate 33 is in a state of vacuum.

In the display P1, each of the electrically conductive thin films 7 is formed in the striped shape, and further each of the collector electrodes 31 is also formed in the striped shape in such a manner that it extends in a direction perpendicular to each of the electrically conductive thin films 7. Accordingly, when voltage (electrical field) is applied to one of the collector electrodes 31 and one of the electrically conductive thin films l7, the electrode 31 and the film 7 being conveniently selected respectively, electrons are emitted only from the electrically conductive thin film 7 to which voltage is applied. Hereupon, only electrons emitted from the region, which exists in the electrically conductive thin film 7 from which the electrons are emitted, corresponding to the collector electrode 31, to which voltage is applied, are accelerated so that the electrons make the fluorescent layer 32 covering the collector electrode 31 emit light.

That is, in the display P1 shown in FIG. 11, a portion in the fluorescent layer 32, which corresponds to the region where the electrically conductive thin film 7 and the collector electrode 31, to each of which voltage is applied, cross together, can be made emit light, by applying voltage to a specific electrically conductive thin film 7 and a specific collector electrode 31. Thus, images or letters can be displayed on the screen of the display P1 by conveniently changing the electrically conductive thin film 7 and the collector electrode 31, to each of which voltage is applied.

The manufacturing method of the field emission-type electron source 10 in Embodiment 14 is nearly as same as that in Embodiment 6. However, the manufacturing method is characterized in that after the electrically conductive thin films 7 patterned in the predetermined shape (striped shape in Embodiment 14) have been formed, there is (are) performed at least one of a treatment which applies ultraviolet rays to the layer in a gas atmosphere containing at least one of oxygen and ozone as described in Embodiment 6, a treatment which exposes the layer to plasma in a gas atmosphere containing at least one of oxygen and ozone as described in Embodiment 7, a treatment which heats the layer in a gas atmosphere containing ozone as described in Embodiment 8, a treatment which applies ultraviolet rays to the layer and heats the layer as described in Embodiment 9, and a treatment which applies ultraviolet rays to the layer in a gas atmosphere containing at least one of oxygen and ozone and heats the layer as described in Embodiment 10. Thus, according to the manufacturing method, by performing the treatments described above, contamination due to organic materials produced in the processes before the treatments may be removed, as well as the porous polycrystalline silicon layer is oxidized so that the electron emitting efficiency may be raised.

Hereupon, the electrically conductive thin films 7 of striped shape may be formed, for example, according to the following process. That is, after an electrically conductive thin film 7 has been formed on the whole surface of the strong field drift layer 6, a photo resist layer is applied and formed on the electrically conductive thin film 7. Then, the photo resist layer is patterned by means of the photo lithography technique. Next, the electrically conductive thin film 7 is etched using the photo resist layer as a mask, and then the photo resist layer is removed.

Hereupon, the electrically conductive thin films 7 of striped shape may be directly formed on the strong field drift layer 6 by means of the vapor deposition process or the like using a metal mask having an aperture pattern of the striped shape.

Figure 12:
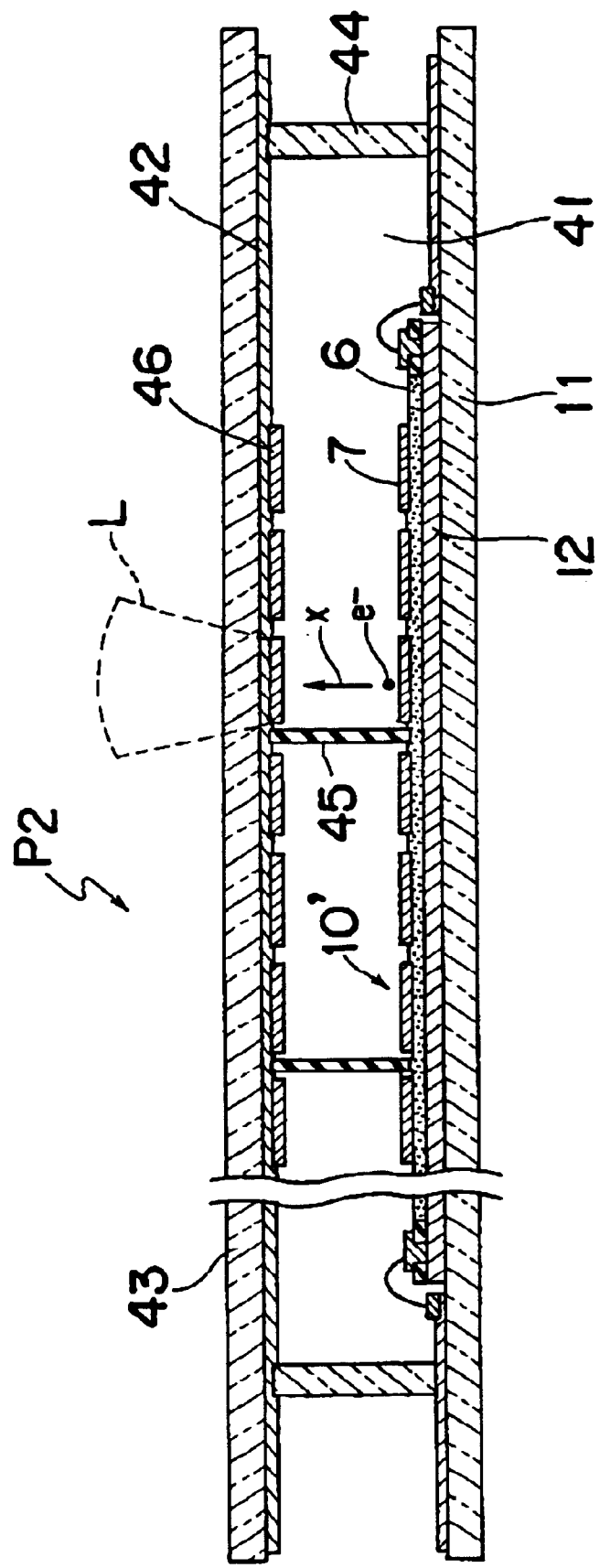
FIG. 12 is an elevational section view of a display which utilizes a field emission-type electron source using a glass substrate, according to the present invention.

In FIG. 12, there is shown an example of a display using a field emission-type electron source 10' which is provided with a substrate in which an electrically conductive film 12 is formed on a glass plate 11 as shown in FIG. 6B.

As shown in FIG. 12, in the display P2, an anode electrode 42 is disposed above the field emission-type electron source 10' while forming a space 41 therebetween, and further a fluorescent glass substrate 43 is disposed on the surface of the anode electrode 42 so as to contact with the electrode closely. Further, the space 41 is enclosed by a shutter glass 44. Hereupon, the space 41 is nearly in the state of vacuum. Moreover, spacers 45 are provided at some desired positions between the field emission-type electron source 10' and the anode electrodes 42. The field emission-type electron source 10' is provided with a plurality of electrically conductive thin films 7. Further, in the position facing each of the electrically conductive thin films 7, a fluorescent member 46 is provided on the lower surface of the anode electrode 42.

Thus, when a predetermined voltage is applied between specific (desired) ones in a plurality of electrically conductive thin films 7 and the anode electrodes 42 facing the specific films 7, electrons e- emitted from the specific electrically conductive thin film 7 proceed in the direction shown by the arrow X, and then collide to the fluorescent members 46 facing the specific electrically conductive thin films 7. In consequence, the fluorescent members 46 emit light as shown by the broken line L.

In the display P2, by applying voltage to specific electrically conductive thin films 7, and specific anode electrodes 42 and electrically conductive film 12, the specific ones in a plurality of fluorescent members 46, which face the specific electrically conductive thin films 7 to which voltage is applied, can be made emit light. Accordingly, images or letters can be displayed on the screen of the display P2 by conveniently changing the electrically conductive thin film 7 and the electrically conductive film 12, to each of which voltage is applied.

EXAMPLE 5

Hereinafter, as Example 5, there will be described a field emission-type electron source 10 (see FIG. 11) manufactured under the following conditions, by means of the manufacturing method according to Embodiment 14.

In Example 5, as the n-type silicon substrate 1, there was used a (100) type silicon substrate, in which the electrical resistivity was 0.1 Ωcm and the thickness was 525 μm. The polycrystalline silicon layer 3 (see FIG. 7A) was formed by means of the LPCVD process. In the film forming process, the degree of vacuum was 20 Pa, the temperature of the substrate was 640° C., and the flow rate of the monosilane gas was 600 sccm.

In the anodic oxidation treatment, there was used an electrolyte in which hydrogen fluoride aqueous solution of 55 wt % and ethanol were mixed together in the ration of nearly 1:1. In the anodic oxidation treatment, the surface of the polycrystalline silicon layer 3 was made contract with the electrolyte. Further, a predetermined current was let flow between the platinum electrode immersed in the electrolyte and the n-type silicon substrate 1 (ohhmic electrode 2) in such a manner that the platinum electrode became a negative electrode and the substrate 1 became a positive electrode. Hereupon, the current density in the anodic oxidation process was the constant value of 30 mA/cm$^2$, and the time of anodic oxidation process was 10 seconds.

In the rapid heating process for oxidizing the porous polycrystalline silicon layer 4, the flow rate of the oxygen gas was 300 sccm, the oxidizing temperature was 900° C., and the oxidizing time was 1 hour. The electrically conductive thin film 7 was formed by patterning a thin gold film using a photo lithography technique, and etching technique or the like, the gold film being deposited on the upper surface of the strong field drift layer 6 by means of the vapor deposition process. Hereupon, the thickness of the electrically conductive thin film 7 was 10 nm.

After the electrically conductive thin film 7 had been formed, there was performed and oxidation treatment (hereinafter, it is referred to "after treatment") which applied ultraviolet rays to the layer in a mixed gas atmosphere (2000 ppm) containing oxygen (O₂) and ozone (O₃). A low-pressure mercury lamp of 110 W was used as a source of ultraviolet rays. The temperature and time of the heating process were 200° C. and 30 minutes, respectively.

Further, there was manufactured a field emission-type electron source to which the after treatment had not been performed, as the comparative example 1 (example for comparison). Moreover, as the comparative example 2, there was also manufactured a field emission-type electron source, in which the electrically conductive thin film 7 had been formed using a metal mask and to which the after treatment had not been performed. The difference between Example 5 and the comparative example 1 was only whether the after treatment was performed or not. The difference between Example 5 and the comparative example 2 was as follows. Namely, in Embodiment 3, the electrically conductive thin film 7 was patterned by means of the photo lithography technique or the like, and then the after treatment was performed. On the other hand, in the comparative example 2, the electrically conductive thin film 7 was patterned during the film-forming step using the metal mask, and then the after treatment was not performed.

Each of the field emission-type electron sources 10, which had been manufactured as described above, was introduced into a vacuum chamber (not shown), and then a collector electrode 21 (electrode for collecting emitted electrons) was disposed at a position facing the electrically conductive thin film 7 as shown FIG. 8. Thus, the degree of vacuum in the vacuum chamber was set to $5\times10^{-5}$ Pa, and the DC voltage Vc. of 100 V was applied between the collector electrode 21 and the electrically conductive thin film 7. Further, there were measured diode current Ips flowing between the electrically conductive thin film 7 and the ohmic electrode 2, and emitted electron current Ie flowing between the collector electrode 21 and the electrically conductive thin film 7 due to electrons e⁻ emitted outward from the field emission-type electron source 10 through the electrically conductive thin film 7, while variously changing DC voltage Vps applied between the electrically conductive thin film 7 (anode) and the ohmic electrode 2 (cathode). the result of the measurement are shown in FIG. 13.

Figure 13:
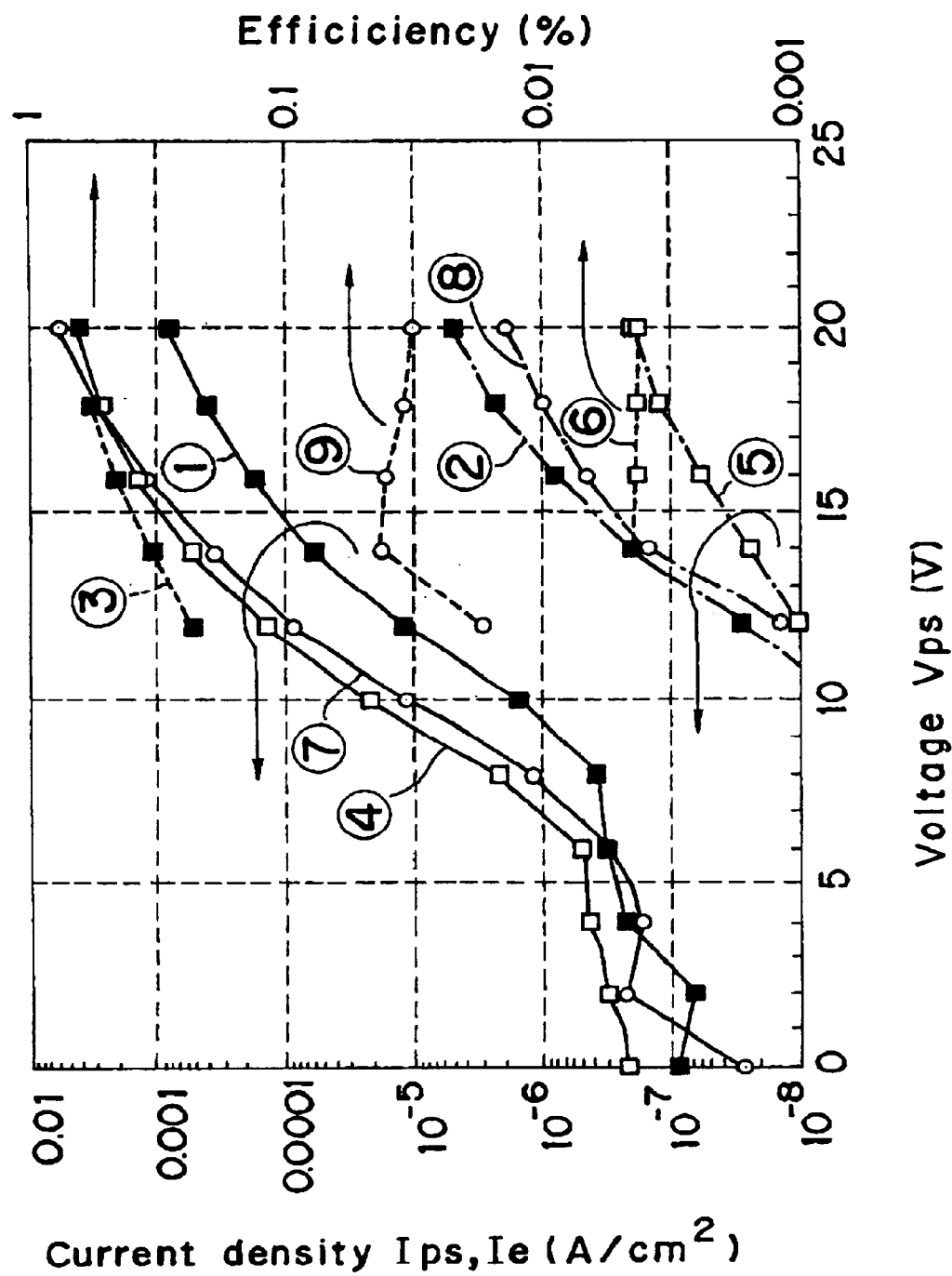
FIG. 13 is a graph showing an operating characteristic of a field emission-type electron source according to Example 5 in Embodiment 14.

In FIG. 13, the horizontal axis shows the DC voltage Vps. The left vertical axis shows the current density of the diode current Ips or the emitted electron current Ie. The right vertical axis shows the electron emitting efficiency (Ie/Ips× 100). Further, the graphs in FIG. 13 show the following physical properties, respectively.

Continuous line ① (■): Ips in Example 5
Dashed line ② (■): Ie in Example 5
Broken line ③ (■): Eff in Example 5
Continuous line ④ (□): Ips in the comparative ex. 1
Dashed line ⑤ (□): Ie in the comparative ex. 1
Broken line ⑥ (□): Eff in the comparative ex. 1
Continuous line ⑦ (○): Ips in the comparative ex. 2
Dashed line ⑧ (○): Ie in the comparative ex. 2
Broken line ⑨ (○): Eff in the comparative ex. 2
 Ips: diode current
 Ie: emitted electron current
 Eff: electron emitting efficiency In FIG. 13, when the comparative example 1 is compared with the comparative example 2, the current density of the emitted electron current Ie of the comparative example 1 is smaller then that of the comparative example 2 (see graphs ⑤, ⑧), although the current densities of the diode currents Ips of the both are nearly same (see graphs ④, ⑦).

Accordingly, the electron emitting efficiency of the comparative example 1 is smaller than that of the comparative example 2 (see graphs ⑥, ⑨). The reason may be considered as follows. Namely, in the comparative example 1, there may remain contamination of organic materials due to the remaining resist of the photo resist layer used for patterning the electrically conductive thin film 7. On the other hand, in the comparative example 2, such contamination of organic materials may less remain, because the metal mask is used for pattering the electrically conductive thin film 7.

Next, when Example 5 is compared with the comparative example 1, the current density of the diode current Ips of Example 5 is smaller than that of the comparative example 1 (see graphs ①, ④), although the current density of the emitted electron current Ie of Embodiment 3 is larger than that of the comparative example 1 (see graphs ②, ⑤). Accordingly, the electron emitting efficiency of Example 5 is higher than that of the comparative example 1 (see graphs ③, ⑥). For example, when the DC voltage Vps is 20 V, the current density of the emitted electron current Ie of Example 5 is as 30 times as that of the comparative example 1, the current density of the diode current Ips of Example 5 being as one fourth (¼) as that of the comparative example 1, and the electron emitting efficiency of Example 5 being as 120 times as that of the comparative example 1. Namely, the electron emitting efficiency of Example 5 is much larger than that of the comparative example 1.

Further, when Example 5 is compared with the comparative example 2, the current density of the emitted electron current Ie of Example 5 is larger than that of the comparative example 2, in consequence the electron emitting efficiency of Example 5 is higher than that of the comparative example 2. Hereupon, the reason why the current density of the emitted electron current Ie of Example 5 is larger than that of the comparative example 2, may be considered as follows. Namely, in Example 5, there may be obtained such an effect that the surface of the field emission-type electron source 10 is purified by the after treatment, and/or an effect that the quality of the silicon oxide film 64 (see FIG. 10A) in the surface of the fine crystal silicon layer 63 which constructs the strong field drift layer 6, is improved (the ratio of the surface covered with oxygen atoms is increased).

Although the present invention has been described in relation to particular embodiments thereof, many other variations and modifications will become apparent to those skilled in the art. It is preferred, therefore, that the present invention be limited not by the specific disclosure herein, but only by the appended claims.

What is claimed is:

1. A field emission-type electron source comprising an electrically conductive substrate, a strong field drift layer formed on a surface of the electrically conductive substrate and an electrically conductive thin film formed on the strong field drift layer, wherein electrons, which are injected into the electrically conductive substrate, drift in the strong field drift layer to be emitted outward through the electrically conductive thin film by applying voltage between the electrically conductive thin film and the electrically conductive substrate in such a manner that the electrically conductive thin film acts as a positive electrode against the electrically conductive substrate, wherein the strong field drift layer is formed by a process including an oxidation which comprises oxidizing a porous semiconductor layer at relatively lower temperature, the strong field drift layer including fine crystalline silicon layers of nano structure and silicon oxide films formed on surfaces of the fine crystalline silicon layers, each of the films having a thickness smaller than a diameter of crystal particles of the fine crystalline silicon layers.

2. The field emission-type electron source according to claim 1, wherein the strong field drift layer is oxidized in a liquid phase in the oxidation.

3. The field emission-type electron source according to claim 2, wherein the porous semiconductor layer is formed by performing an anodic oxidation to a semiconductor layer.

4. A method of manufacturing a field emission-type electron source including an electrically conductive substrate, a strong field drift layer formed on a surface of the electrically conductive substrate, which includes fine crystalline silicon layers of nano structure and silicon oxide films formed on surfaces of the fine crystalline silicon layers, each of the films having a thickness smaller than a diameter of crystal particles of the fine crystalline silicon layers, and an electrically conductive thin film formed on the strong field drift layer, wherein electrons, which are injected into the electrically conductive substrate, drift in the strong field drift layer to be emitted outward through the electrically conductive thin film by applying voltage between the electrically conductive thin film and the electrically conductive substrate in such a manner that the electrically conductive thin film acts as a positive electrode against the electrically conductive substrate, the method comprising a main oxidation which comprises forming a strong field drift layer by oxidizing a porous semiconductor layer at relatively lower temperature.

5. The method of manufacturing the field emission-type electron source according to claim 4, wherein the porous semiconductor layer is oxidized in a liquid phase in the main oxidation.

6. The method of manufacturing the field emission-type electron source according to claim 5, wherein the liquid phase is an acid solution.

7. The method of manufacturing the field emission-type electron source according to claim 6, further comprising a supplemental oxidation by means of a heating process, the supplemental oxidation step being performed before and/or after the main oxidation.

8. The method of manufacturing the field emission-type electron source according to claim 7, further comprising a pre oxidation which comprises oxidizing the porous semiconductor layer using an oxidant solution, the pre oxidation being performed before the main oxidation or before the main oxidation and the supplemental oxidation.

9. The method of manufacturing the field emission type electron source according to claim 6, further comprising pre oxidizing the porous semiconductor layer using an oxidant solution and a supplemental oxidation by a heating process, the pre oxidation being performed before the main oxidation or before the main oxidation and the supplemental oxidation.

10. The method of manufacturing the field emission-type electron source according to claim 6, wherein the acid solution is dilute nitric acid, dilute sulfuric acid or aqua regia.

11. The method of manufacturing the field emission-type electron source according to claim 5, further comprising a supplemental oxidation by means of a heating process, the supplemental oxidation step being performed before and/or after the main oxidation.

12. The method of manufacturing the field emission-type electron source according to claim 11, further comprising a pre oxidation which comprises oxidizing the porous semiconductor layer using an oxidant solution, the pre oxidation being performed before the main oxidation or before the main oxidation and the supplemental oxidation.

13. The method of manufacturing the field emission type electron source according to claim 5, further comprising pre oxidizing the porous semiconductor layer using an oxidant solution and a supplemental oxidation by a heating process, the pre oxidation being performed before the main oxidation or before the main oxidation and the supplemental oxidation.

14. The method of manufacturing the field emission-type electron source according to claim 4, wherein the porous semiconductor layer is oxidized in an electrolyte solution by means of an electrochemical reaction in the main oxidation.

15. The method of manufacturing the field emission-type electron source according to claim 14, wherein the electrolyte solution is an acid solution.

16. The method of manufacturing the field emission-type electron source according to claim 15, further comprising a supplemental oxidation by means of a heating process, the supplemental oxidation step being performed before and/or after the main oxidation.

17. The method of manufacturing the field emission-type electron source according to claim 16, further comprising a pre oxidation which comprises oxidizing the porous semiconductor layer using an oxidant solution, the pre oxidation being performed before the main oxidation or before the main oxidation and the supplemental oxidation.

18. The method of manufacturing the field emission type electron source according to claim 8, further comprising pre oxidizing the porous semiconductor layer using an oxidant solution and a supplemental oxidant by a heating process, the pre oxidation being performed before the main oxidation or before the main oxidation and the supplemental oxidation.

19. The method of manufacturing the field emission-type electron source according to claim 14, further comprising a supplemental oxidation by means of a heating process, the supplemental oxidation step being performed before and/or after the main oxidation.

20. The method of manufacturing the field emission-type electron source according to claim 19, further comprising a pre oxidation oxidizing the porous semiconductor layer using an oxidant solution, the pre oxidation being performed before the main oxidation or before the main oxidation and the supplemental oxidation.

21. The method of manufacturing the field emission type electron source according to claim 7, further comprising pre oxidizing the porous semiconductor layer using an oxidant solution and a supplemental oxidation by a heating process, the pre oxidation being performed before the main oxidation or before the main oxidation and the supplemental oxidation.

22. The method of manufacturing the field emission-type electron source according to claim 4, further comprising a supplemental oxidation by means of a heating process, the supplemental oxidation step being performed before and/or after the main oxidation.

23. The method of manufacturing the field emission-type electron source according to claim 22, further comprising a pre oxidation which comprises oxidizing the porous semiconductor layer using an oxidant solution, the pre oxidation being performed before the main oxidation or before the main oxidation and the supplemental oxidation.

24. The method of manufacturing the field emission type electron source according to claim 4, further comprising pre oxidizing the porous semiconductor layer using an oxidant solution and a supplemental oxidation by a heating process, the pre oxidation being performed before the main oxidation or before the main oxidation and the supplemental oxidation.

25. The method of manufacturing the field emission-type electron source according to claim 24, wherein the oxidant solution is any one of or a mixture of plural ones of concentrated nitric acid, concentrated sulfuric acid, hydrochloric acid and hydrogen peroxide.

26. The method of manufacturing the field emission-type electron source according to claim 25, wherein the oxidant solution is used in a heated state.

27. A display for displaying an image on a screen thereof, including:
- a field emission-type electron source according to claim 1;
- a collector electrode disposed so as to face the field emission-type electron source;
- a fluorescent member disposed on a surface of the collector electrode, the surface facing the field emission-type electron source; and
- a member for applying voltage between the collector electrode and an electrically conductive thin film of the field emission-type electron source; wherein
- when voltage is applied between the collector electrode and the electrically conductive thin film, the image is displayed on the screen by colliding electrons emitted from the field emission-type electron source to the fluorescent member so as to make the fluorescent member emit light.

28. The method of manufacturing the field emission-type electron source according to claim 4, wherein in the main oxidation, the porous semiconductor layer is oxidized by means of at least one of a treatment which applies ultraviolet rays to the porous semiconductor layer in a gas atmosphere containing at least one of oxygen and ozone, a treatment which exposes the porous semiconductor layer to plasma in a gas atmosphere containing at least one of oxygen and ozone, a treatment which heats the porous semiconductor layer in a gas atmosphere containing ozone, a treatment which applies ultraviolet rays to the porous semiconductor layer and heats the porous semiconductor layer, and a treatment which applies ultraviolet rays to the porous semiconductor layer in a gas atmosphere containing at least one of oxygen and ozone and heats the porous semiconductor layer.

29. The method of manufacturing the field emission-type electron source according to claim 28, wherein the main oxidation is performed after the electrically conductive thin film has been formed.

30. The method of manufacturing the field emission-type electron source according to claim 29, further comprising a supplemental oxidation which comprises oxidizing the porous semiconductor layer by means of a heating process, the supplemental oxidation being performed before and/or after the main oxidation.

31. The method of manufacturing the field emission-type electron source according to claim 30, further comprising a pre oxidation which comprises oxidizing the porous semiconductor layer using an oxidant solution, the pre oxidation being performed before the main oxidation and the supplemental oxidation.

32. The method of manufacturing the field emission-type electron source according to claim 29, further comprising a further supplemental oxidation which comprises oxidizing the porous semiconductor layer using an acid solution, the further supplemental oxidation being performed before and/ or after the main oxidation.

33. The method of manufacturing the field emission-type electron source according to claim 32, further comprising a pre oxidation which comprises oxidizing the porous semiconductor layer using an oxidant solution, the pre oxidation being performed before the main oxidation and the supplemental oxidation.

34. The method of manufacturing the field emission-type electron source according to claim 29, further comprising a pre oxidation of oxidizing the porous semiconductor layer using an oxidant solution, the pre oxidation step being performed before the main oxidation step.

35. The method of manufacturing the field emission-type electron source according to claim 28, further comprising a supplemental oxidation which comprises oxidizing the porous semiconductor layer by means of a heating process, the supplemental oxidation being performed before and/or after the main oxidation step.

36. The method of manufacturing the field emission-type electron source according to claim 35, further comprising a pre oxidation which comprises oxidizing the porous semiconductor layer using an oxidant solution, the pre oxidation being performed before the main oxidation and the supplemental oxidation.

37. The method of manufacturing the field emission-type electron source according to claim 28, further comprising a further supplemental oxidation which comprises oxidizing the porous semiconductor layer using an acid solution, the further supplemental oxidation being performed before and/ or after the main oxidation.

38. The method of manufacturing the field emission-type electron source according to claim 37, further comprising a pre oxidation which comprises oxidizing the porous semiconductor layer using an oxidant solution, the pre oxidation being performed before the main oxidation and the supplemental oxidation.

39. The method of manufacturing the field emission-type electron source according to claim 28, further comprising a pre oxidation which comprises oxidizing the porous semiconductor layer using an oxidant solution, the pre oxidation being performed before the main oxidation.

40. The method of manufacturing the field emission-type electron source according to claim 4, wherein the porous semiconductor layer is a porous monocrystalline silicon layer or a porous polycrystalline silicon layer.

41. The method of manufacturing the field emission-type electron source according to claim 4, wherein the electrically conductive substrate is an n-type silicon substrate.

42. The method of manufacturing the field emission-type electron source according to claim 4, wherein the electrically conductive substrate is a substrate in which an electrically conductive film is formed on a surface of an insulation plate.

43. The method of manufacturing the field emission-type electron source according to claim 42, wherein the insulating plate is composed of glass or ceramic.

44. The method of manufacturing the field emission-type electron source according to claim 4, further comprising forming the porous semiconductor layer by performing an anodic oxidation to a semiconductor layer.

* * * * *

UNITED STATES PATENT AND TRADEMARK OFFICE
CERTIFICATE OF CORRECTION

PATENT NO.   : 6,285,118 B1
DATED        : September 4, 2001
INVENTOR(S)  : E. Hatai et al.

It is certified that error appears in the above-identified patent and that said Letters Patent is hereby corrected as shown below:

Column 33,
Line 40, after "oxidation" delete "step".
Line 62, after "oxidation" delete "step".

Column 34,
Line 20, after "oxidation" delete "step".
Line 29, "claim 8" should be -- claim 15 --.
Line 31, "oxidant" should be -- oxidation --.
Line 38, after "oxidation" delete "step".
Line 42, after "oxidation" insert -- which comprises --.
Line 56, after "oxidation" delete "step".

Column 36,
Line 13, after "oxidation" delete "of", and insert -- which comprises --.
Line 15, after "oxidation" delete "step".
Line 55, "insulation" should be -- insulating --.

Signed and Sealed this

Twentieth Day of August, 2002

Attest:

JAMES E. ROGAN
Attesting Officer    Director of the United States Patent and Trademark Office